United States Patent [19]

Miyamori et al.

[11] Patent Number: 5,825,320

[45] Date of Patent: Oct. 20, 1998

[54] GAIN CONTROL METHOD FOR AUDIO ENCODING DEVICE

[75] Inventors: Shinji Miyamori; Masatoshi Ueno, both of Tokyo, Japan

[73] Assignee: Sony Corporation, Tokyo, Japan

[21] Appl. No.: 816,090

[22] Filed: Mar. 13, 1997

Related U.S. Application Data

[63] Continuation-in-part of Ser. No. 720,663, Oct. 2, 1996.

[30] Foreign Application Priority Data

Mar. 19, 1996 [JP] Japan .................................. 8-062966

[51] Int. Cl.⁶ .................................................. H03M 1/18
[52] U.S. Cl. ............................................................ 341/139
[58] Field of Search ............................ 341/139; 455/140, 455/234.1, 245.1; 375/345

[56] References Cited

U.S. PATENT DOCUMENTS

| | | | |
|---|---|---|---|
| 4,002,841 | 1/1977 | Ching et al. | 179/15 AS |
| 4,485,483 | 11/1984 | Torick et al. | 381/14 |
| 4,696,040 | 9/1987 | Doddington et al. | 381/46 |
| 4,704,726 | 11/1987 | Gibson | 381/13 |
| 4,972,484 | 11/1990 | Theile et al. | 381/37 |
| 5,109,417 | 4/1992 | Fielder et al. | 381/36 |
| 5,117,228 | 5/1992 | Fuchigami et al. | 341/200 |
| 5,134,658 | 7/1992 | Chen et al. | 381/46 |
| 5,142,656 | 8/1992 | Fielder et al. | 381/37 |
| 5,157,760 | 10/1992 | Akagiri | 395/2 |
| 5,185,800 | 2/1993 | Mahieux | 381/29 |
| 5,241,603 | 8/1993 | Akagiri et al. | 381/37 |
| 5,264,846 | 11/1993 | Oikawa | 341/76 |
| 5,268,685 | 12/1993 | Fujiwara | 341/76 |
| 5,274,711 | 12/1993 | Rutledge et al. | 381/73 |
| 5,285,476 | 2/1994 | Akagiri et al. | 375/25 |
| 5,384,891 | 1/1995 | Asakawa et al. | 395/2.29 |
| 5,388,181 | 2/1995 | Anderson et al. | 395/212 |
| 5,394,473 | 2/1995 | Davidson | 381/36 |
| 5,410,741 | 4/1995 | Cahill et al. | 455/69 |
| 5,438,643 | 8/1995 | Akagiri et al. | 395/2.1 |
| 5,454,011 | 9/1995 | Shimoyoshi | 375/240 |
| 5,471,558 | 11/1995 | Tsutsui | 395/2.28 |
| 5,502,789 | 3/1996 | Akagiri | 395/2.13 |
| 5,506,907 | 4/1996 | Ueno et al. | 381/18 |
| 5,541,600 | 7/1996 | Blumenkrantz et al. | 341/139 |
| 5,550,924 | 8/1996 | Helf et al. | 381/94 |
| 5,581,654 | 12/1996 | Tsutsui | 395/2.39 |
| 5,623,577 | 4/1997 | Fielder | 395/2.38 |
| 5,625,743 | 4/1997 | Fiocca | 395/2.14 |
| 5,632,003 | 5/1997 | Davidson et al. | 395/2.38 |
| 5,634,082 | 5/1997 | Shimoyoshi et al. | 395/2.38 |
| 5,651,090 | 7/1997 | Moriya et al. | 395/2.31 |

FOREIGN PATENT DOCUMENTS

| | | |
|---|---|---|
| 0193143 B1 | 5/1986 | European Pat. Off. ......... H04B 1/66 |
| 0251028 A2 | 1/1988 | European Pat. Off. ......... H04B 1/66 |
| 0424161 A2 | 4/1991 | European Pat. Off. ......... G10L 9/16 |
| 0428156 A2 | 5/1991 | European Pat. Off. ......... H03M 7/30 |
| 0653846 A1 | 5/1995 | European Pat. Off. ......... H03M 7/30 |
| 63-7023 | 1/1988 | Japan ............................. H03M 1/00 |
| 3-132228 | 6/1991 | Japan ............................. H04B 14/00 |
| 6-334534 | 12/1994 | Japan ............................. H03M 7/30 |
| WO 91/16769 | 10/1991 | WIPO ............................. H04B 1/66 |

OTHER PUBLICATIONS

M. Fuma et al., "A Single Chip Decompression LSI Based on Atrac for Mini Disc", IEEE Transactions on Consumer Electronics, vol. 39, No. 3, Aug. 1993.

(List continued on next page.)

*Primary Examiner*—Brian K. Young
*Attorney, Agent, or Firm*—Limbach & Limbach L.L.P.

[57] ABSTRACT

A method and apparatus for encoding input signals, such as digital data, by so-called high-efficiency encoding, in which pre-echo and post-echo are suppressed. A gain control position decision circuit detects an attack portion and a release portion of an audio signal entering an input terminal. An acoustic model application circuit finds a masking level based on a psychoacoustic model of the input signal. A gain control decision circuit determines the gain control value adaptively selected in accordance with the masking level. A gain control circuit controls the gain of the audio signal entering the input terminal in meeting with the gain control value.

16 Claims, 14 Drawing Sheets

OTHER PUBLICATIONS

A. Sugiyama, et al., "Adaptive Transform Coding with an Adaptive Block Size (ATC–ABS)", C&C Systems Research Labs, NEC Corp., Kanagawa, Japan, IEEE Apr. 3–6, 1990.

R. Crochiere, "Digital Coding of Speech in Sub–Bands," The Bell System Technical Journal, vol. 55, No. 8, Oct. 1976.

J. Rothweiler, "Polyphase Quadrature Filters —A New Subband Coding Technique," ICASSP Apr. 14–16, 1983, vol. 3, pp. 1280–1283.

J. Princen et al., "Subband Transform Coding Using Filter Bank Based on Time Domain Aliasing Cancellation," ICASSP Apr. 6–9, 1987, vol. 4, pp. 2161–2164.

M. Krasner, "The Critical Band Coder—Encoding of Speech Signals Based on the Perceptual Requirements of the Auditory System," ICASSP, Apr. 1980, vol. 1–3, pp. 327–331.

R. Zelinski et al., "Adaptive Transform Coding of Speech Signals," IEEE Transactions on Acoustics, Speech and Signal Processing, vol. ASSP–25, No. 4, Aug. 1977.

FIG.3F

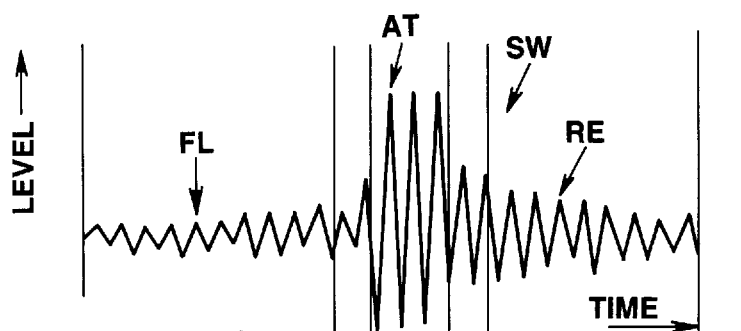
FIG.11A
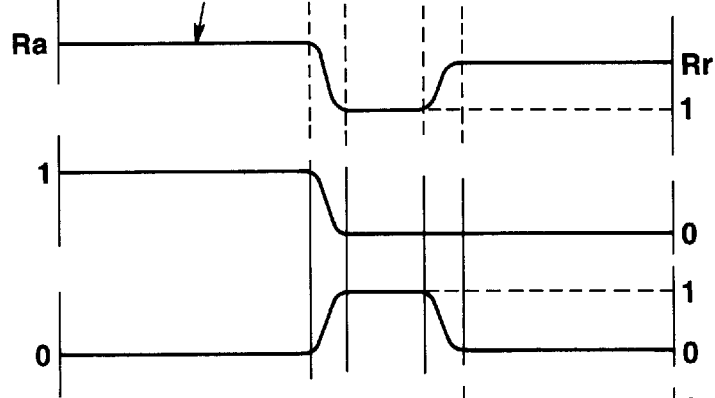
FIG.11B
FIG.11C
FIG.11D
FIG.11E
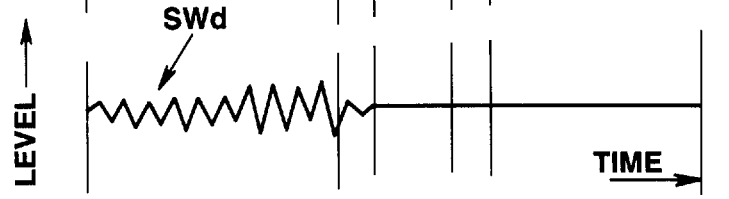
FIG.11F
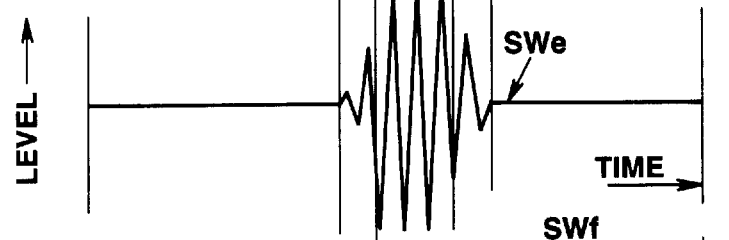
FIG.11G
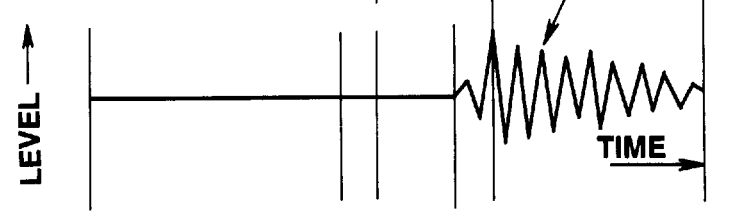
FIG.11H

GAIN CONTROL METHOD FOR AUDIO ENCODING DEVICE

This is continuation in part of Ser. No. 08/720,663 filed Oct. 2, 1996.

BACKGROUND OF THE INVENTION

1. Field of the Invention

This invention relates to a method and apparatus for encoding input signals, such as digital data, by so-called high-efficiency encoding.

2. Description of the Related Art

A variety of high-efficiency encoding techniques exist for encoding audio or speech signals. Examples of these techniques include so-called transform coding asa a blocking frequency spectrum splitting system and a so-called sub-band coding system (SBC) as a non-blocking frequency spectrum splitting system. In the transform coding, audio signals on the time axis are blocked every pre-set time interval, the blocked time-domain signals are transformed into signals on the frequency axis, and the resulting frequency-domain signals are encoded from band to band. In the sub-band coding system, the audio signals on the time axis are split into plural frequency bands and encoded without blocking. In a combination of the sub-band coding system and the transform coding system, the audio signals on the time axis are split into plural frequency bands by sub-band coding system, and the resulting band-based signals are transformed into frequency-domain signals by orthogonal transform for encoding.

As band-splitting filters used in the sub-band coding system, there is a so-called quadrature mirror filter (QMF) discussed in R. E. Crochiere, "Digital Coding of Speech in Subbands", Bell Syst. Tech. J., Vol. 55, No. 8, 1976. This QMF filter divides the frequency spectrum in two bands of equal bandwidths. With the QMF filter, so-called aliasing is not produced on subsequent synthesis of the band-split signals.

The technique of splitting the frequency spectrum into equal frequency bands is discussed in Joseph H. Rothweiler, "Polyphase Quadrature Filters—A New Subband Coding Technique", ICASSP 83 BOSTON. With the polyphase quadrature filter, the signal can be split at a time into plural frequency bands of equal bandwidths.

Among the techniques for orthogonal transform, there is known such a technique in which the input audio signal is split into frames of a predetermined time duration and the resulting frames are processed by discrete Fourier transform (DFT), discrete cosine transform (DCT) or modified DCT (MDCT) to convert the signals from the time axis to the frequency axis. Discussions of a MDCT may be found in J. P. Princen and A. B. Bradley, "Subband/Transform Coding Using Filter Bank Based on Time Domain Aliasing Cancellation", ICASSP 1987.

By quantizing signal components split from band to band by a filter or orthogonal transform, it becomes possible to control the band subjected to quantization noise, thus enabling encoding with perceptually higher encoding efficiency by exploiting masking effects. By normalizing respective sample data with the maximum value of the absolute values of the signal components in each band prior to quantization, the encoding efficiency can be improved further.

As the band splitting width used for quantizing the signal components resulting from splitting of the frequency spectrum of the audio signals, the band width taking into account the psychoacoustic characteristics of the human being is preferably used. That is, it is preferred to divide the frequency spectrum of the audio signals into a plurality of, for example, 25, critical bands. The width of the critical bands increases with increasing frequency. In encoding the band-based data in such case, bits are fixedly or adaptively allocated among the various critical bands. For example, when applying adaptive bit allocation to the special coefficient data resulting from a MDCT, the spectra coefficient data generated by the MDCT within each of the critical bands is quantized using an adaptively allocated number of bits. The following two techniques are known as the bit allocation technique.

In R. Zelinsky and P. Noll, "Adaptive transform Coding of Speech Signals", "IEEE Transactions of Acoustics, Speech and Signal processing", vol. ASSP-25, August 1977, bit allocation is carried out on the basis of the amplitude of the signal in each critical band. This technique produces a flat quantization spectrum and minimizes noise energy, but the noise level perceived by the listener is not optimum because the technique does not exploit the psychoacoustic masking effect.

In M. A. Krassener, "The Critical Band Coder—Digital Encoding of the Perceptual Requirements of the Auditory System", there is described a technique in which the psychoacoustic masking effect is used to determine a fixed bit allocation that produces the necessary bit allocation for each critical band. However, with this technique, since the bit allocation is fixed, non-optimum results are obtained even for a strongly tonal signal such as a sine wave.

For overcoming this problem, it has been proposed to divide the bits that may be used for bit allocation into a fixed pattern allocation fixed for each band or each small block subdivided from the band and a bit allocation portion dependent on the amplitude of the signal in each block. The division ratio is set depending on a signal related to the input signal such that the division ratio for the fixed allocation pattern portion becomes higher the smoother the pattern of the signal spectrum.

With this method, if the audio signal has high energy concentration in a specified spectral signal component, as in the case of a sine wave, abundant bits are allocated to a block containing the signal spectral component for significantly improving the signal-to-noise ratio as a whole. In general, the hearing sense of the human being is highly sensitive to a signal having sharp spectral signal components, so that, if the signal-to-noise ratio is improved by using this method, not only the numerical values as measured can be improved, but also the audio signal as heard may be improved in quality.

Various other bit allocation methods have been proposed and the perceptual models have become refined, such that, if the encoding device is of high ability, a perceptually higher encoding efficiency may be achieved.

If DFT or DCT is used as method for orthogonal transform of the waveform signal, composed of waveform elements, such as time-domain digital audio signals, a block is formed every M sample data, as an example, and the orthogonal transform, such as DFT or DCT, is executed on the block basis. If orthogonal transform is performed on the block basis, M independent real-number data (DFT coefficient data or DCT coefficient data) are produced. These M real-number data are subsequently quantized and encoded into encoded data.

For decoding the encoded data in order to re-construct reproduced waveform signals, the encoded data is decoded and de-quantized and the resulting real-number data is processed with inverse DFT or inverse DCT on the basis of the block corresponding to the block used for encoding in order to produce waveform element signals. The respective blocks, comprised of the waveform element signals, are connected together to re-construct waveform signals.

The reproduced waveform signals, thus re-constructed, suffer from connection distortions produced at the time of block connection and hence are not psychoacoustically optimum. For reducing the block-to-block connection distortion, M1 samples each of mutually neighboring blocks are overlapped for effecting orthogonal transform prior to encoding.

However, if the M1 samples each of the mutually neighboring blocks are overlapped for orthogonal transform, M real-number data are obtained on an average for (M–M1) sample data, such that the number of the real-number data obtained on orthogonal transform becomes larger than the number of the original sample data used for orthogonal transform. Since the real-number data are subsequently quantized and encoded, it is not desirable for the encoding efficiency that the number of the real-number data obtained on orthogonal transform be larger than the number of the original sample data.

If the above-mentioned MDCT is used as a method for converting waveform signals comprised of sample data, such as samples of digital audio signals, orthogonal transform is executed on 2M sample data obtained on overlapping M samples each of two neighboring blocks for producing M independent real-number data (MDCT coefficient data) for reducing block-to-block connection distortions. Thus, in orthogonal transform by MDCT, M real-number data are obtained on an average from M sample data, thus achieving encoding more efficient than is possible with the orthogonal transform employing the above-mentioned DFT or MDCT.

If the encoded data obtained by quantizing and encoding real-number data obtained using the above-mentioned orthogonal transform by MDCT are decoded for generating reproduced waveform signals, the encoded data is decoded and dequantized to real-number data which are then inverse orthogonally transformed by IMDCT to form waveform elements in a block. The original waveform signal may be re-constructed by adding the waveform elements together with interference with one another.

In general, if the block length for orthogonal transform, that is the block size in the direction along time axis, is increased, frequency resolution is increased. If waveform signals, such as digital audio signals, are orthogonally transformed using a long block length, signal energies are concentrated in a specified spectral component. If orthogonal transform is performed on neighboring blocks having sufficient overlap length, block-to-block distortion of the waveform signals can be reduced satisfactorily. Moreover, if the above-mentioned MDCT, in which orthogonal transform is performed on blocks one-half samples of which are overlapped with one-half samples of the neighboring blocks, and in which the number of real-number data obtained by this orthogonal transform is not increased beyond the number of samples of the original waveform signals, is used as the technique for orthogonal transform, the encoding efficiency may be higher than if the above-mentioned DFT or DCT is used.

Meanwhile, if the waveform signals are blocked and resolved into spectral components (real-number data resulting from orthogonal transform in the above example) from block to block, with the resulting spectra components being then quantized and encoded, there is produced the quantization noise in the waveform signals obtained on subsequently decoding the encoded spectral components and synthesizing the decoded signals from block to block.

If a signal portion with acutely changing signal components, that is a transient signal portion with acutely changing level of the waveform elements, is contained in the original waveform signals, and such waveform signals are encoded and subsequently decoded, there are occasions wherein the large quantization noise ascribable to the transient portion is spread to the portion of the original waveform signals other than the transient portion.

It is assumed that, as an audio signal for encoding, such a waveform signal SW1 shown in FIG. 1 is employed, which has a quasi-stationary signal FL with low steady signal level followed by an attack portion AT having an abruptly increasing signal level as the transient portion, followed in turn by a spell of high-level signals. If the waveform signal SW1 is blocked in unit time widths, the signal components in the blocks are orthogonally transformed, the resulting spectral components are quantized and encoded, and the resulting encoded signals are inverse orthogonal transformed, decoded and dequantized to re-constructed waveform signal SW11, such a signal in which a large quantization noise QN1 higher in level than the quasi-stationary signal FL, ascribable to the attack portion AT, appears in the quasi-stationary signal portion FL temporally previous to the attack portion AT.

The quantization noise QN1, appearing in the portion of the quasi-stationary signal portion FL temporally previous to the attack portion AT, is not masked by concurrent masking by the attack portion AT and hence proves to be obstructions to the hearing sense. The quantization noise QN1, appearing temporally before the attack portion AT with suddenly increased sound level, is generally termed pre-echo. In orthogonally transforming signal components in a block, a transform window function having a peak in the attack portion AT and having smoothly changing portions on its both sides as shown in FIG. 1B is applied to the block before proceeding to orthogonal transform for preventing the spectral distribution from being spread to a wide range.

In particular, if the waveform signals are orthogonally transformed using a long block for raising the frequency resolution, time resolution is lowered such that pre-echo tends to be produced for longer time.

If the block length for orthogonal transform is reduced, the time period of generation of the above-mentioned quantization noise is diminished. Thus, by reducing the block length for orthogonal transform in the vicinity of the attack portion AT, the time period of generation of the pre-echo may be diminished for reducing the obstructions to the hearing sense otherwise caused by pre-echo.

The method for preventing pre-echo by reducing the block length in the vicinity of the attack portion AT is now explained. If, in the vicinity of the attack portion AT (signal portion with abruptly changed signal level) in the waveform signal SW having the quasi-stationary portion FL besides the attack portion AT, the block length for orthogonal transform is reduced, and orthogonal transform is applied only to signal components in the short block, pre-echo is produced only in the short block such that the time period of occurrence of the pre-echo can be reduced sufficiently. If the time period of occurrence of the pre-echo can be reduced sufficiently within the short block length, it becomes possible to reduce the obstruction to the hearing sense by the so-called counter-masking effect by the attack portion AT. Meanwhile, with short block length, the signal components in the block are orthogonally transformed after applying the short transform window function TWS as shown in FIG. 2B.

On the other hand, if the block length for orthogonal transform is reduced for the quasi-stationary signal portion FL or the signal portion downstream of the attack portion AT, the frequency resolution is lowered such that the encoding efficiency for these signal portions is lowered. Therefore, it is preferred to use a longer block length for orthogonal transform since then the signal energy is concentrated in specified spectral components, thus raising the encoding efficiency.

For this reason, it is a frequent practice to selectively switch the block length for orthogonal transform depending on the properties of various portions of the waveform signals. Meanwhile, if the block length is switched selectively, the transform window function TW is similarly switched depending on the selected block length. For example, the transform window function TW is selectively switched so that a long transform window function TWL is used for a block made up of the quasi-stationary signal FL excluding the attack portion AT and its vicinity, while a short transform window function TWS is used for a short block in the vicinity of the attack portion AT.

However, if the method of selectively switching between the different block lengths for orthogonal transform depending on the properties or characteristics of respective portions of the waveform signals should be implemented by an actual device, such an orthogonal transform device capable of coping with orthogonal transform of different block lengths needs to be provided in the encoding device, while an inverse orthogonal transform device capable of performing inverse orthogonal transform for coping with blocks of different lengths needs to be provided on the decoding apparatus.

Moreover, if it is desired to vary the block length for orthogonal transform, the number of the orthogonal transform obtained on orthogonal transform becomes proportionate to the block length, such that, if these spectral components are encoded from one critical band to another, the number of the spectral components contained in the critical bands becomes different with the block lengths, thus complicating the subsequent encoding and decoding operations.

That is, with the method of varying the block length for orthogonal transform, both the encoding device and the decoding apparatus become sophisticated in structure.

As a method for effectively preventing the occurrence of pre-echo in carrying out orthogonal transform by DFT or DCT while maintaining a constant block length for orthogonal transform capable of maintaining sufficient frequency resolution, there is known a technique disclosed in, for example, the European Laying-Open Patent 0251028.

In the European Laying-Open Patent 0251028, there is disclosed an encoding method consisting in slicing an input signal waveform in an encoding device in terms of blocks made up of plural sample data, as a unit, multiplying the blocks with a window function, detecting an attack portion, amplifying a waveform signal of small amplitudes directly previous to the attack portion, that is the quasi-stationary signal, producing spectral components (real-number data) by orthogonal transform by DFT or DCT and encoding the resulting real-number data. For decoding, the decoded spectral components are inversely orthogonally transformed, such as by inverse DFT or inverse DCT, and subsequently corrected for amplification for signals directly previous to the attack portion performed during encoding. This prohibits occurrence of the pre-echo. By this method, the length of the block for orthogonal transform can be maintained perpetually constant, thus simplifying the generation of the pre-echo.

In the U.S. application Ser. No. 08/720663, which is the basic application of the present CIP application, there is proposed a method of preventing not only the pre-echo but also the post-echo. In this senior application, there is proposed a method consisting in detecting an attack portion where the waveform elements of the waveform signals are acutely increased in level, detecting the release portion where the waveform elements of the waveform signals are acutely decreased in signal level, adaptively selecting the gain control value for the waveform elements temporally previous to the attack portion and the waveform elements of the release portion from plural gain control values depending on the characteristics of the waveform signals, gain-controlling at least the waveform elements temporally previous to the attack portion and the waveform elements of the release portion, transforming the waveform elements into plural frequency components, finding the masking level based on the psychoacoustic model from the waveform signals, encoding the plural frequency components using the masking level and encoding the control information for gain control.

With the proposed method, the attack portion and the release portion are detected from the waveform signals during encoding, the waveform elements temporally previous to the attack portion and the waveform elements of the release portion are gain-controlled with gain control values adaptively selected depending on the characteristics of the waveform signals prior to encoding and the encoded signals are decoded along with gain control correction for the signal portion gain-controlled during encoding. Thus the energy of the noise produced in the waveform elements temporally previous to the attack portion and the waveform elements of the release portion can be reduced to an imperceptible level.

With the above-described method for preventing occurrence of the pre-echo and the post-echo by exploiting the gain control and the gain control correction as described above, since the gain control value for the waveform elements temporally previous to the attack portion and the waveform elements of the release portion is simply adaptively selected depending on the characteristics of the time-domain waveform signals, such that it is difficult to encode the waveform signals in keeping with the psychoacoustic characteristics of the human being.

This is now explained with reference to a waveform signal SW shown in FIG. 3 in which a quasi-stationary signal FL is followed by an attack portion AT, as an example of a waveform signal subjected to pre-echo. If the waveform signal SW shown in FIG. 3A is gain-controlled so that, in accordance with the gain control function GC shown in FIG. 3B as determined by the waveform element of a signal portion directly previous to the attack portion AT and the waveform element of a signal portion corresponding to the attack portion AT, the gain control value for the signal components of the signal portion directly previous to the attack portion AT (waveform signal FL) is Ra times that of the signal portion downstream of the attack portion AT, the signal actually encoded is a waveform signal SW11 shown in FIG. 3C.

It is assumed that a waveform signal obtained by slicing the waveform signal FL from the waveform signal SW shown in FIG. 3A using a window function in which the coefficients directly previous and directly posterior to the attack portion AT are 1 and 0, respectively, as shown in FIG. 3D, is a waveform signal SW21 as shown in FIG. 3E, and that a waveform signal obtained by slicing the signal portion downstream of the attack portion AT as shown in FIG. 3A using a window function in which the coefficients directly previous and directly posterior to the attack portion AT are 0 and 1, respectively, as shown in FIG. 3F, is a waveform signal SW22 as shown in FIG. 3G.

It is also assumed that a masking curve as found using a psychoacoustic model for respective spectral components obtained on orthogonal transform of the waveform signal SW21 shown in FIG. 3E is a curve MCa shown by a broken line in FIG. 4A, and that a masking curve as found using a psychoacoustic model for respective spectral components obtained on orthogonal transform of the waveform signal SW22 shown in FIG. 3G is a curve MCb shown by a broken line in FIG. 4B. Since the waveform signal SW21 shown in FIG. 3E is multiplied with the gain control function GC shown in FIG. 3B, the masking curve is also multiplied by Ra to give a masking curve MCRa shown by a solid line in FIG. 4A.

As for the masking curve for respective spectral components obtained on orthogonal transform of the waveform signal SW11 actually used for encoding, a masking curve MCc shown in FIG. 4C, obtained on selecting the smaller values of the masking curve MCa shown in FIG. 4A or the masking curve MCb shown in FIG. 4B, as already proposed in the aforementioned U.S. application Ser. No. 08/720663, is preferably employed.

It is then envisaged that the a gain control value Rb larger than the above-mentioned control value Ra is used for effecting gain control. A masking curvemodel for respective speacoustic model for respective spectra components obtained on orthogonal transform of a waveform signal obtained in turn on gain controlling the waveform signal SW21 is a curve MCRb shown by a solid line in FIG. 5A. As for the masking curve for respective spectral components obtained on orthogonal transform of the waveform signal SW11 actually used for encoding, a masking curve MCm shown in FIG. 5B, obtained on selecting the smaller values of the masking curve MCRb shown in FIG. 5A or the masking curve MCb shown in FIG. 5B, is preferably employed.

FIG. 5C shows FIGS. 4C and 5B in superposition. The spectral components actually encoded are amplitude portions thereof larger than the masking curve such that the number of bits required for encoding the spectral components becomes smaller the smaller the portion of spectral components larger than the masking curve for the spectral components. In FIG. 5C, the number of bits becomes larger if the spectral components are encoded with the masking curve MCc than if the spectral components are encoded with the masking curve MCm. That is, the encoding efficiency is lowered if the masking curve MCc is used.

SUMMARY OF THE INVENTION

It is therefore an object of the present invention to provide a signal encoding method and apparatus in which gain control is performed by applying the psychoacoustic model for improving the aforementioned U.S. application Ser. No. 08/720663 for effectively preventing the occurrence of pre-echo or post-echo for enabling encoding by more efficient gain control.

The present invention provide a gain controlling method and a gain control apparatus including detecting an attack portion in which the signal level of waveform elements of the waveform signals rises sharply and a release portion in which the signal level of the waveform signals decays sharply, finding a masking level based on a psychoacoustic model using the waveform signals and the detection position information of the attack portion and the release portion, adaptively selecting a gain control value from plural gain control values using the selected masking curve, gain-controlling at least the waveform elements previous to the attack portion and the waveform elements of the release portion, using the gain control value, transforming the gain-controlled waveform signals into plural frequency components and encoding the control information for gain control and the plural frequency components.

According to the present invention, gain control selected from the masking level based on the psychoacoustic model is performed for preventing generation of pre-echo and post-echo and for achieving more efficient encoding.

BRIEF DESCRIPTION OF THE DRAWINGS

FIGS. 3A to 3G illustrate the conventional gain controlling technique for preventing occurrence of pre-echo.

FIGS. 11A to 11H illustrate a processing technique of a the processing technique of a circuit for generating a waveform for the psychoacoustic model of FIG. 1.

DESCRIPTION OF THE PREFERRED EMBODIMENTS

Figure 1A:
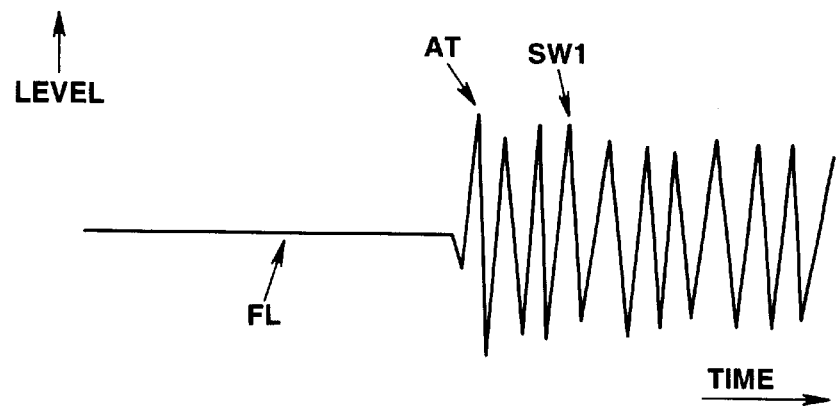
FIGS. 1A to 1C illustrate the operating principle of occurrence of pre-echo as a result of transform coding.

Referring to the drawings, preferred embodiments of the present invention will be explained in detail.

Figure 6:
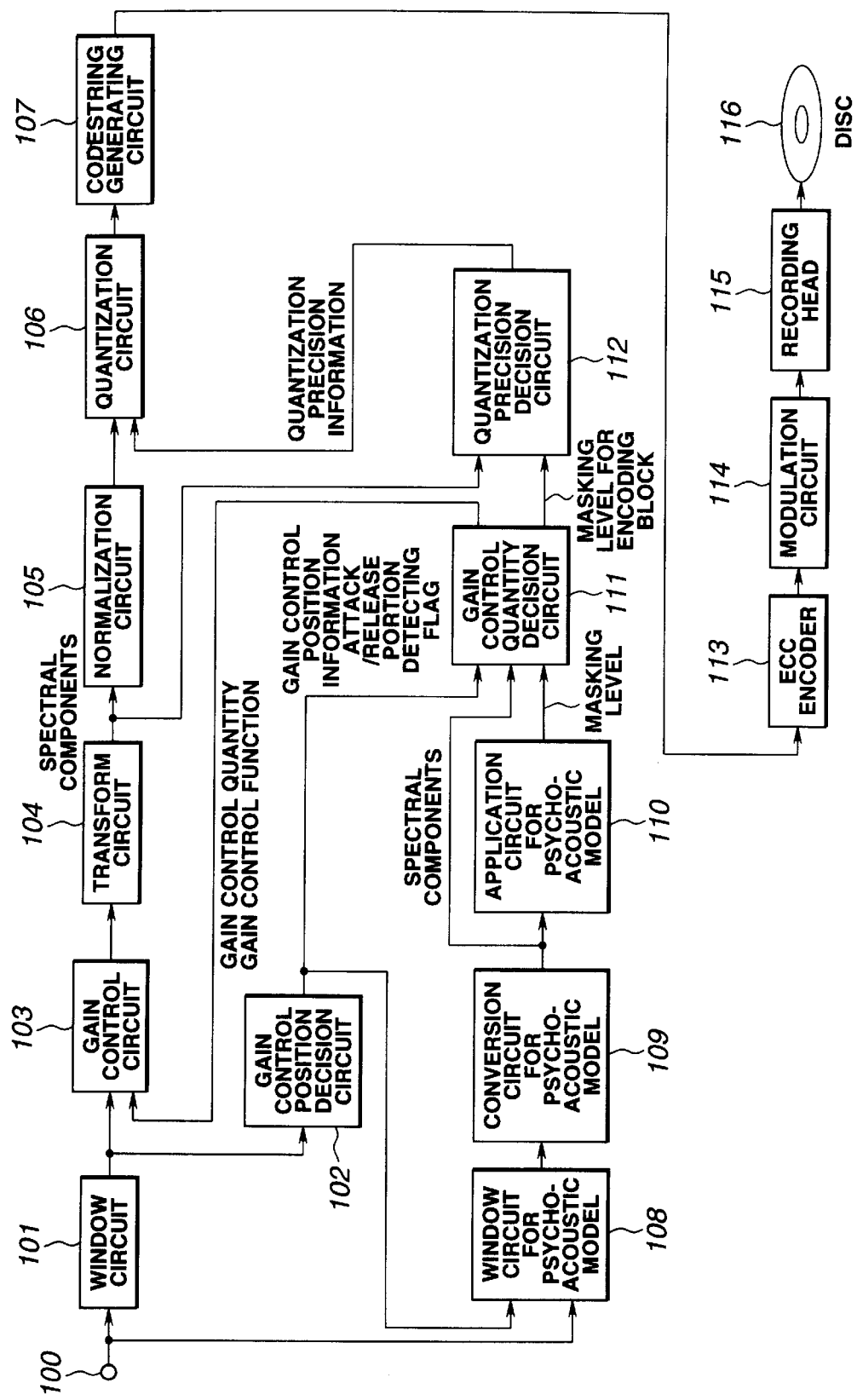
FIG. 6 is a schematic block diagram showing the structure of a first embodiment of a signal encoding device according to the present invention.

FIG. 6 shows a signal encoding device for carrying out the signal encoding method according to a first embodiment of the present invention.

The signal encoding device has a windowing circuit 101 for slicing an input signal entering a terminal 100 from one encoding block to another and for applying the resulting blocks with a windowing function for transform. An output of the windowing function 101 is inputted to a gain position decision circuit 102 for determining the position for performing gain control on the waveform signal sliced by the window and a gain control circuit 103 for performing gain control responsive to the gain control function. An output of the gain position decision circuit 102 is sent to a windowing circuit 108 for a psychoacoustic model for slicing the input signal entering the terminal 100 in terms of an acoustic model block as a unit for applying a windowing function for transform, and to a gain control value decision circuit 111 for determining an optimum gain control value and an optimum gain control function from the gain control position and the masking level for calculating the masking level for encoding blocks from the gain control value and the masking level. The acoustic model window is changed in length depending on the gain control position. An output of the acoustic model windowing circuit 108 is supplied to a transform circuit for a psychoacoustic model 109, outputs of which are sent to a circuit for acoustic model application 110 and to the gain control value decision circuit 111. The circuit for acoustic model application 110 converts the signal sliced from one acoustic model block to another into frequency components.

An output of a transform circuit 104 for transforming signals gain-controlled by the gain control circuit 103 into frequency components is fed to a normalization circuit 105 for normalizing frequency components and to a quantization precision decision circuit 112 for determining the quantization precision from the signals converted into the frequency components using a masking level for encoding blocks. An output of the acoustic model application circuit 110 is supplied to the gain control value decision circuit 111, an output of which is sent to the gain control circuit 103 and to the quantization precision decision circuit 112.

To a quantization circuit 106 for quantizing frequency components normalized with the precision determined by the normalization circuit 105 is supplied an output of the quantization precision decision circuit 112. An output of the quantization circuit 106 is supplied to a codestring generating circuit 107 where a codestring is generated from the quantized frequency components, information on normalization coefficients for normalization and the information on the quantization precision.

The encoding device of FIG. 6 has an ECC encoder 113 for appending an error correction code to an output of the codestring generating circuit 107 for recording the codestring signal generated by the encoding device on an optical disc 116 as an information recording medium, a modulation circuit 114 for modulating an output of the codestring generating circuit 107 and a recording head 115 for recording an output of the modulation circuit 114 on the optical disc 116.

In the embodiment of FIG. 6, an acoustic signal (waveform signal), such as digital audio signal, is supplied to the terminal 100 and thence supplied to the windowing circuit 101 which then slices the supplied signal in terms of an encoding block of a pre-set length as a unit while overlapping neighboring encoding blocks with each other and applying a transform window on the encoding blocks.

The gain control position decision circuit 102 detects whether or not there is a attack portion or a release portion in the encoding block multiplied by the windowing function for transform by the windowing circuit 101 and determines the gain control position corresponding to the detected attack or release portion. The gain control position decision circuit 102 sends the gain control position information to the windowing circuit 108 for acoustic model and to the gain control value decision circuit 111. The gain control position decision circuit 102 sends not only the position information indicating the position of the attack portion or the release portion in the encoding block of the signal components in each encoding block but also an attack/release portion detection flag specifying the presence of these portions.

The acoustic signals supplied to the terminal 100 are also sent to the windowing circuit for acoustic model 108, which then checks the attack/release portion detection flag from the gain control position decision circuit 102 and, in the absence of both the attack portion and the release portion, slices the supplied acoustic signals in terms of a block for an acoustic model of the same length as the encoding block of the windowing circuit 101 while overlapping neighboring blocks for acoustic model with one another and multiplying each acoustic model block with the windowing function for transform. Since the output of the windowing circuit for the acoustic model 108 becomes the same as the output of the windowing circuit 101, the output of the windowing circuit 101 may be used as the output of the windowing circuit for acoustic model 108.

The windowing circuit for acoustic model 108 checks the attack/release portion detection flag from the gain control position decision circuit 102 and, should there be an attack portion or a release portion, slices the supplied acoustic signals on the basis of an acoustic model block shorter than the encoding block of the windowing circuit 101 as a unit, while overlapping neighboring blocks for acoustic model with one another and multiplying each acoustic model block with a transform window function.

The transform circuit 109 for the acoustic model performs orthogonal transform, such as DFT or DCT, on the acoustic model block based signal components multiplied with the windowing function for transform by the windowing circuit for acoustic model 108. This orthogonal transform is preferably the transform by the same technique as that of the transform circuit 104 since it enables application of a psychoacoustic model in meeting with the encoding. The spectral components obtained by this orthogonal transform are sent to the acoustic model application circuit 110.

The acoustic model application circuit 110 calculates, for each of the frequencies corresponding to respective spectral components of the signal frequency spectrum obtained by the acoustic model transform circuit 109 or for each band obtained on splitting the frequency spectrum, the minimum audibility level, or the masking level, that may be found from the supplied spectral components using the masking characteristics or loudness characteristics.

The gain control value decision circuit 111 calculates the total number of bits required for encoding in each encoding block, for each of plural gain control values, using the masking level supplied from the acoustic model application circuit 110, gain control position information supplied from the gain control position decision circuit 102 and the spectral components supplied from the acoustic model transform circuit 109 and finds the gain control value which minimizes the total number of bits in order to calculate an optimum gain control value and an optimum gain control function. The calculated results are sent to the gain control circuit 103. The gain control value decision circuit 111 also converts the masking using the gain control function in order to calculate an appropriate masking level for the encoding block for the spectral component in case of performing the gain control, and transmits the result to the quantization precision decision circuit 112. The detailed processing performed by the gain control value decision circuit 111 in case there is the attack portion or the release portion in the encoding block will be explained subsequently.

The gain control circuit 103 applies the gain control function, supplied from the gain control value decision circuit 111, to signal components of each encoding block multiplied with the windowing function for transform by the windowing circuit 101 for performing gain control of amplifying small-amplitude signals (quasi-stationary signals) upstream of the attack portion in the block, or gain control of amplifying the signals of the release portion in the block. If there is no attack portion or release portion, the gain control circuit 103 does not perform signal amplification on the signal components in the encoding block. The encoding-block-based signal components (waveform elements) outputted by the gain control circuit 103 are sent to the transform circuit 104.

The transform circuit 104 performs orthogonal transform, such as DFT, DCT or MDCT, on the encoding-block-based signal components, supplied thereto, while grouping the spectral components resulting form orthogonal transform from one frequency band to another. The frequency bands used in grouping the spectral components resulting from the orthogonal transform may be of uniform width or, alternatively, of nonuniform widths in meeting with the critical bandwidths.

The normalization circuit 105 normalizes the signals of the spectral components supplied from the transform circuit 104 from one pre-set band to another and routes the resulting normalized signals to the quantization circuit 106. The quantization precision decision circuit 112 determines the quantization precision using the spectral components supplied from the transform circuit 104 and the masking level information for the encoding block supplied from the gain control value decision circuit 111 and routes the resulting quantization precision information to the quantization circuit 106.

The codestring generating circuit 107 converts the quantized signal from the quantization circuit 106 into a codestring signal based on the simultaneously supplied quantization information. In an output signal from the codestring generating circuit 107, there are contained, in addition to the signal quantized by the quantization circuit 106, the normalization coefficient information from the normalization circuit 105, the quantization precision information from the quantization precision decision circuit 112, an attack/release portion detection flag specifying the presence of the attack portion or the release portion in a given encoding block, the position information specifying the position of the flag, the gain control information and the gain control function.

The codestring signal generated by the codestring generating circuit 107 is sent to the ECC encoder 113, which then adds an error correction code to the codestring signal sent from the codestring generating circuit 107. An output of the ECC encoder 113 is modulated by the modulation circuit 114 by, for example, 8–14 modulation, before being supplied to the recording head 115. The recording head 115 records the codestring entered from the modulation circuit 114 on the disc 116. The disc 116 may be a magneto-optical disc or a phase-change disc. An IC card may also be used in place of the disc 116. Of course, the modulated signals may be transmitted on a pre-set transmission medium in place of being recorded on the disc 116.

Figure 7:
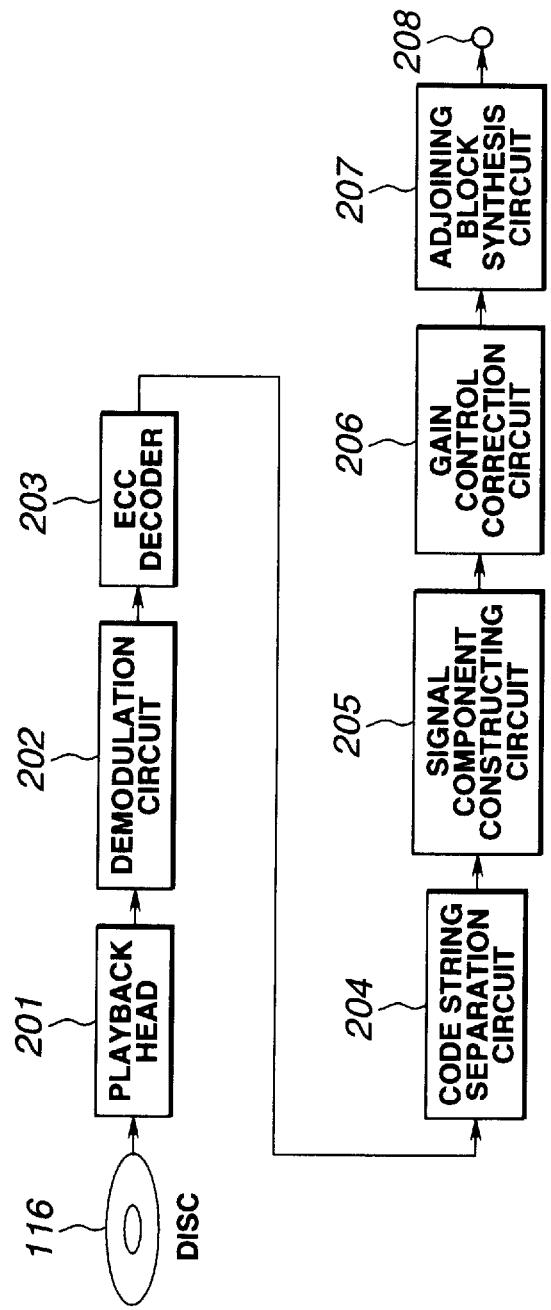
FIG. 7 is a schematic block diagram showing the structure of first and second embodiments of a signal decoder according to the present invention.

FIG. 7 shows the basic structure of a decoding device for decoding the codestring signal generated by the encoding device shown in FIG. 6 for being recorded on the optical disc 116 or transmitted on the transmission medium for restoration of the digital audio signals.

Figure 2A:
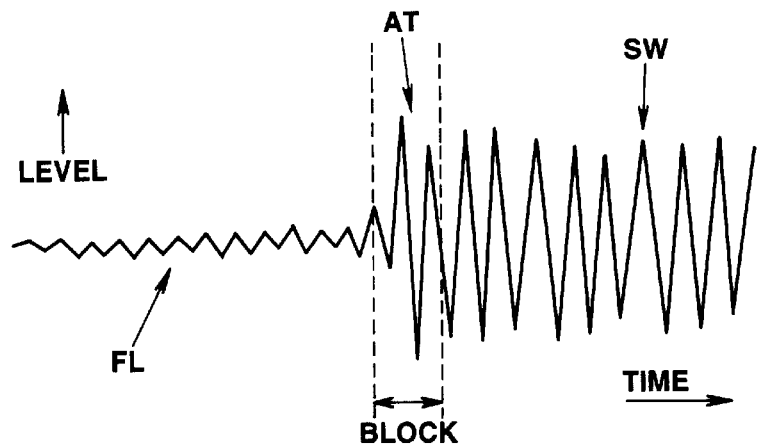
FIGS. 2A and 2B illustrate the conventional windowing for preventing occurrence of pre-echo.
Figure 2B:
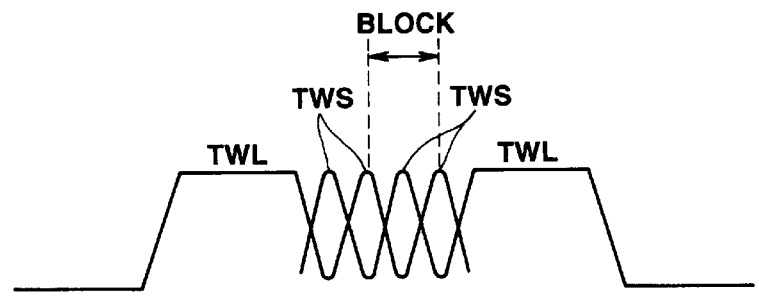
Figure 3A:
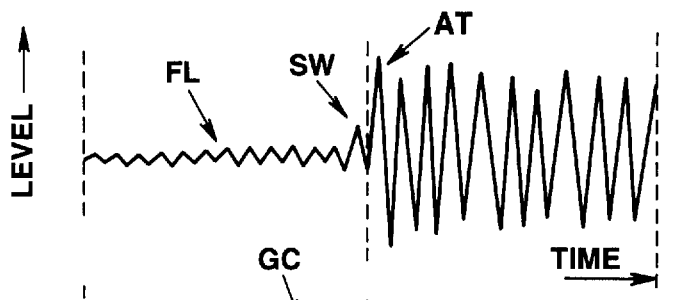
Figure 3B:
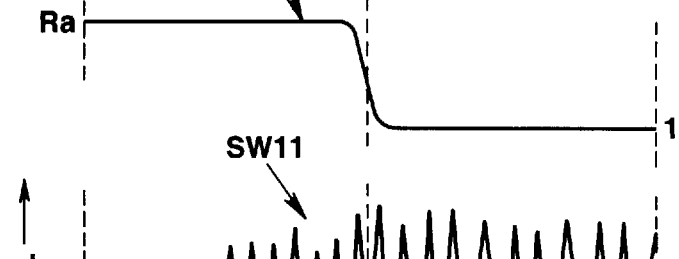
Figure 3C:
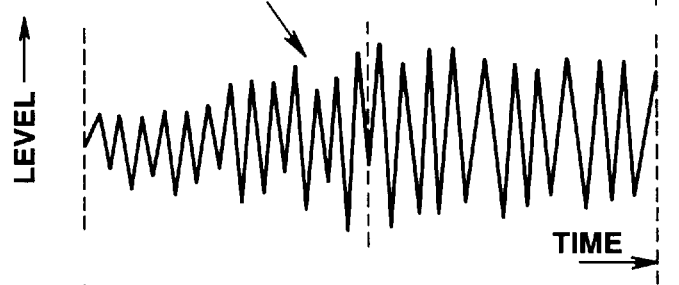
Figure 3D:
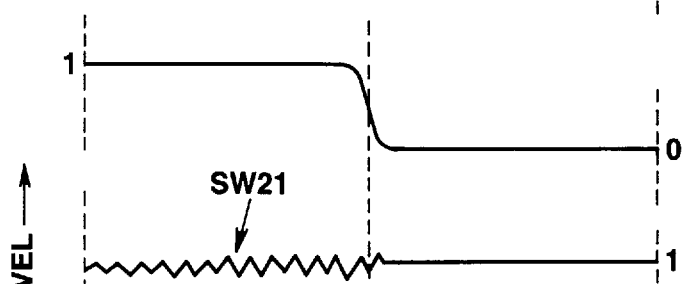
Figure 3E:
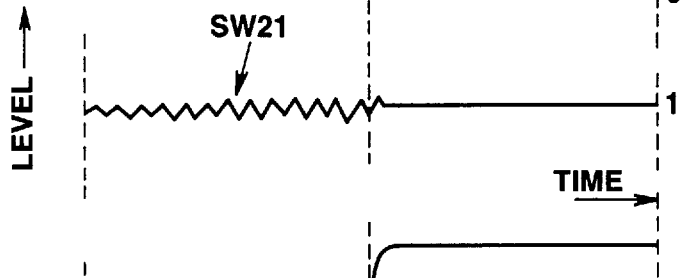
Figure 3G:
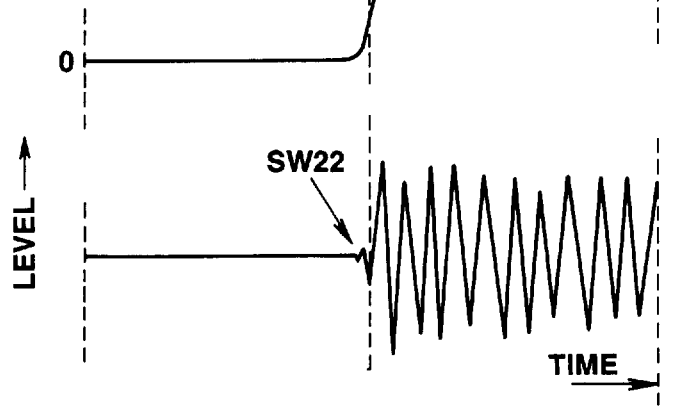
Figure 4A:
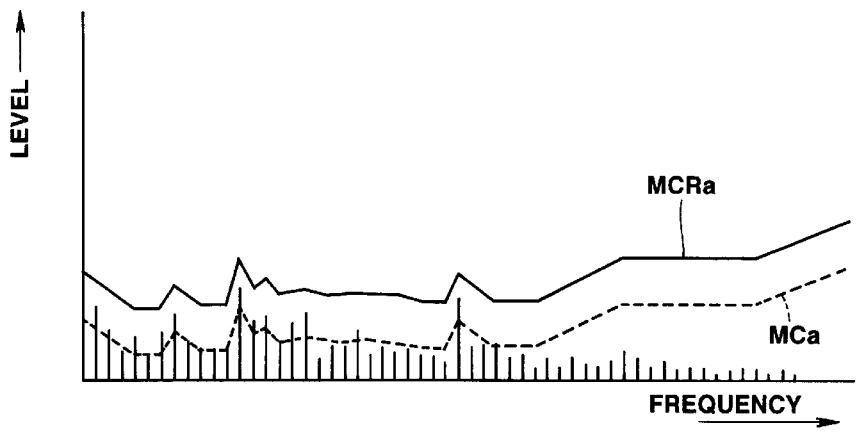
FIGS. 4A to 4C are graphs for illustrating the status of a psychoacoustic model in the conventional processing technique for preventing occurrence of pre-echo.
Figure 4B:
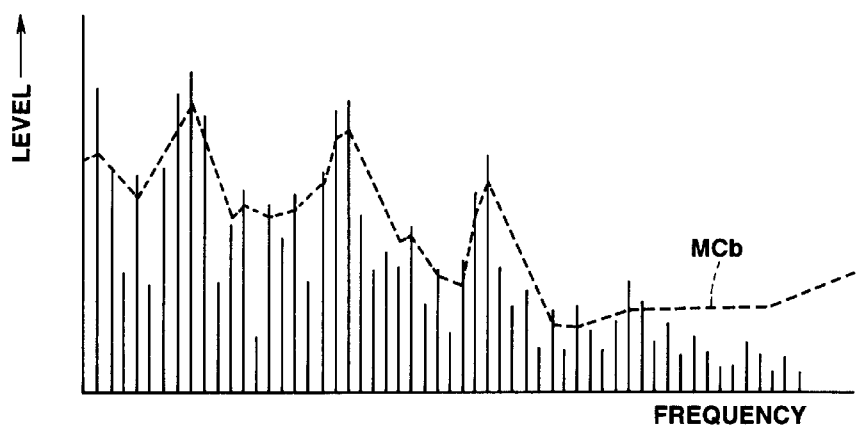
Figure 4C:
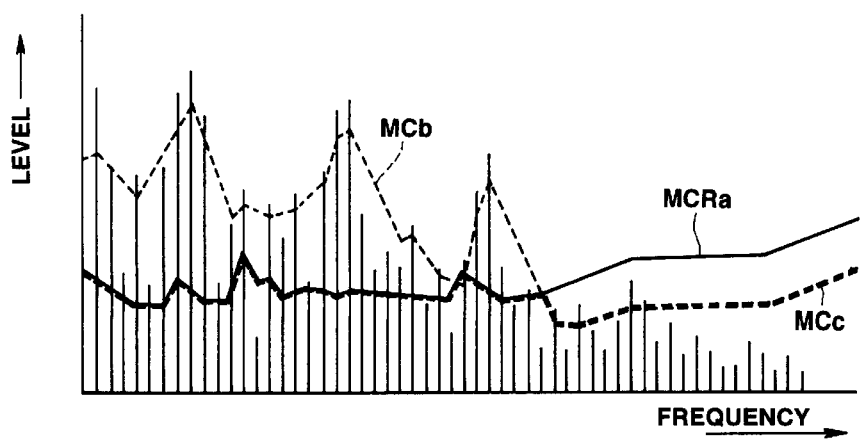

The decoding device shown in FIG. 2 includes, as a configuration for reproducing the codestring signal recorded on the optical disc 116 as an information recording medium, a playback head 201, a demodulation circuit 202 for demodulating an output of the playback head 201, and an ECC decoder 203 for error correcting an output of the demodulation circuit 202. The decoding device also includes a codestring separation circuit 204 for separating the quantization signal, quantization precision information and the normalization coefficient information from the codestring signal outputted by the ECC decoder 203, and a signal component constructing circuit 205 for constructing signal components from the quantization signal, quantization precision information and the normalization coefficient information. The decoding device further includes a gain control correction circuit 206 for performing gain control correction on the signal components and a neighboring block synthesis circuit 207 for synthesizing signals of overlapped neighboring encoding blocks for re-constructing waveform signals for outputting the re-constructed waveform signals from a terminal 208.

In FIG. 2, the signal reproduced from the optical disc 116 by the playback head 201 is sent to the demodulation circuit 202. The demodulation circuit 202 demodulates the signal reproduced from the optical disc 116 by the playback head 201 since the signal has been modulated by, for example, 8–14 modulation. An output signal of the demodulation circuit 202 is sent to the ECC decoder 203. The ECC decoder 203 performs error correction. The resulting error-corrected signal is the codestring signal which is sent to a codestring separation circuit 204. The codestring signal is composed of the quantization signal, normalization coefficient information and the quantization precision information.

The codestring separation circuit 204 separates the quantization signal, normalization coefficient information and the quantization precision information explained with reference to FIG. 6 from the supplied codestring information and sends the separated information to the signal component constructing circuit 205.

The signal component constructing circuit 205 dequantizes the quantized signal using the quantization precision information while denormalizing the normalized signal using the normalization coefficient information. In addition, the signal component constructing circuit 205 processes the denormalized signals by a re-constructing operation (inverse orthogonal transform) associated with resolution into frequency components (orthogonal transform) performed by the encoding device of FIG. 6, for restoring the sample data. The sample data from the signal component constructing circuit 205 are sent to the gain control correction circuit 206.

The gain control correction circuit 206 performs a gain control correction processing operation of attenuating quasi-stationary signals of small amplitudes upstream of the attack portion or the signals of the release portion based on the attack/release flag specifying the presence of the attack portion or the release portion in a given encoding block, the position information specifying the flag position or the gain control function. The gain control correction processing in the gain control correction circuit 206 is the processing of multiplying the data with the gain control correction function which is a reciprocal of the gain control function used for encoding.

By attenuating the signal amplified during encoding, the portion of the quantization noise spread substantially uniformly in the encoding block at the stage of inverse orthogonal transform from the frequence domain to the time domain by the signal component re-constructing circuit 205 and which has been produced before and after the attack portion is suppressed to a lower level, thus suppressing the hindrance to the hearing sense due to pre-echo or post-echo. On the other hand, the gain control correction circuit 206 does not perform signal attenuation on the encoding block in which there is no attack portion nor release portion and hence no amplification has been performed during encoding. The encoding-block-based signal components, outputted by the gain control correction circuit 206, are sent to the neighboring block synthesis circuit 207.

The neighboring block synthesis circuit 207 performs synthesis by adding sample signals in the overlapped encoding blocks with interference with one another. Thus the neighboring block synthesis circuit 207 outputs synthesized waveform signals (digital audio signals) which are outputted at the output terminal 208 so as to be sent to a sound radiating portion such as a speaker, headphone or an earphone after amplification by an amplifier or so as to be outputted via a speech line output terminal.

The processing by the gain control value decision circuit 111 in case the attack portion or the release portion exists in a given encoding block is hereinafter explained.

The gain control position decision circuit 102 detects the attack portion in a waveform signal subjected to pre-echo and post-echo and determines a position for gain control. The method for detecting the attack portion AT in the encoding block has already been proposed by the present Assignee in U.S. application Ser. No. 08/604479.

Further, according to the present invention, masking level calculations are preformed using a windowing circuit separately for an acoustic model by way of performing optimum gain control using a psychoacoustic model. That is, if the length of analysis in a usual windowing circuit 101, that is the length of the input signal sliced with overlapping for encoding, is L, the windowing circuit for the acoustic model 108 performs analysis with plural areas obtained using windows of a length of analysis equal to $L/2^n$, where n is a natural number.

Figure 8:
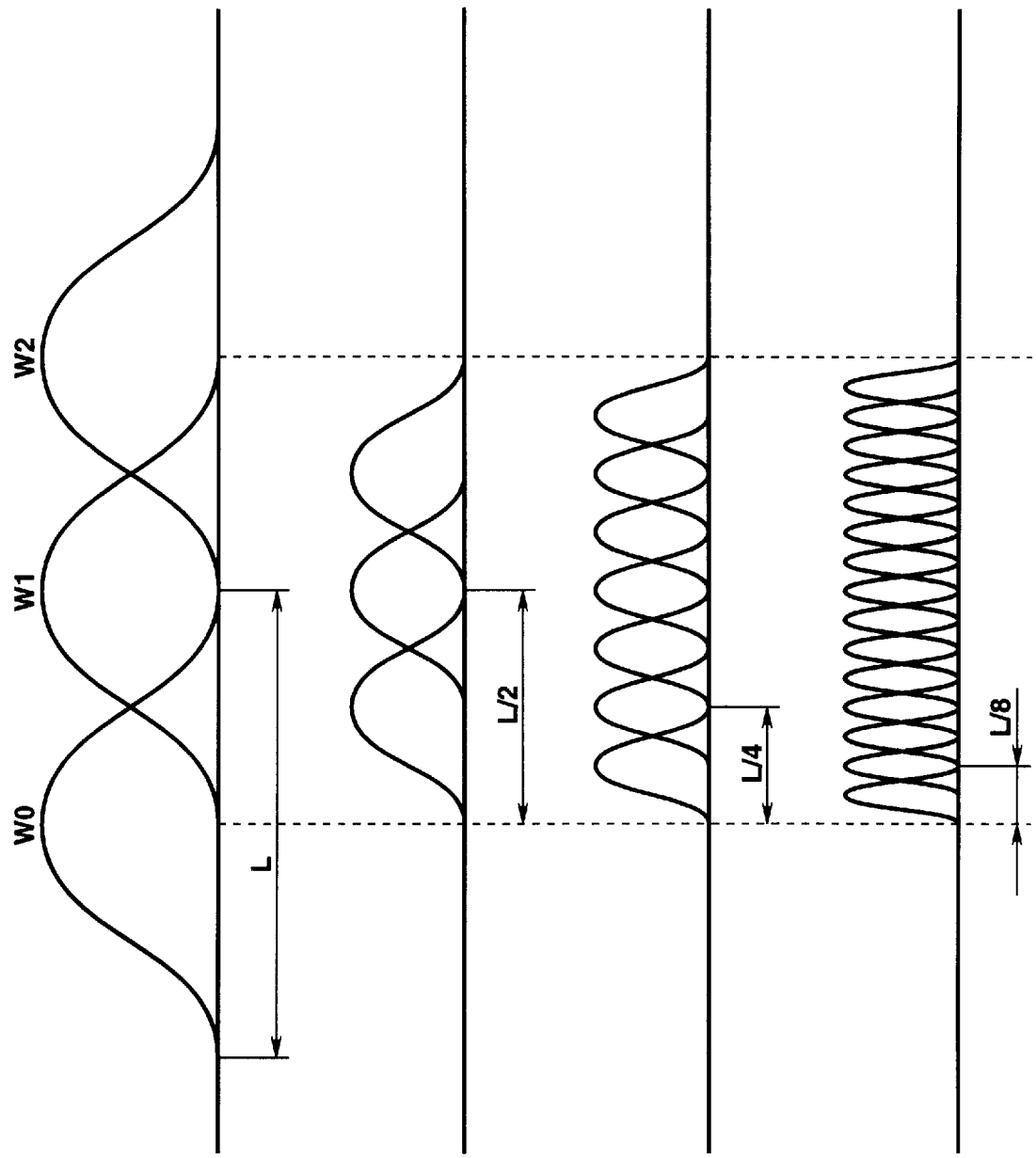
FIGS. 8A to 8D illustrate the processing technique for a windowing circuit for a psychoacoustic model of FIG. 1.

FIG. 8A shows a window of a length L with which the input signal is multiplied by the usual windowing circuit 101. In this figure, W0, W1 and W2 denote overlapped blocks for analysis (encoding blocks). If the block W1 is encoded, the windowing circuit for the acoustic model 108 multiplies the block with windows of the lengths of analysis equal to L/2, L/4 and L/8, shown in FIGS. 8B to 8D. Subsequently, the calculations employing the psychoacoustic model are carried out for each individual block (each block for acoustic model). For example, FIG. 8B shows that the acoustic model is multiplied with a window of a length of analysis equal to L/2 so as to be analyzed three times. Similarly, FIG. 8C shows that the acoustic model is multiplied with a window of a length of analysis equal to L/4 so as to be analyzed seven times, while FIG. 8D shows that the acoustic model is multiplied with a window of a length of analysis equal to L/8 so as to be analyzed fifteen times.

The transform circuit for the acoustic model 109 executes orthogonal transform on each of the blocks for acoustic model from the windowing circuit for the acoustic model 108. The block for analysis is divided on the $1/2^n$ basis for facilitating the orthogonal transform.

The acoustic model application circuit 110 applies a psychoacoustic model to the spectral components from the transform circuit for the acoustic model 109. It is now assumed that an input signal to be processed is an input signal SW having a quasi-stationary signal followed by an attack portion AT. If now the input signal is multiplied with windows each having a length for analysis of L/2 shown in FIG. 9C, the transform circuit for the acoustic model 109 outputs three spectral distributions each made up of m spectral components. By applying psychoacoustic models, such as minimum audibility levels, masking characteristics or loudness characteristics to each of the spectral distributions, and by calculating the masking levels for the blocks for acoustic model, masking curves MCd, MCe and MCf, as shown by broken lines in FIGS. 9D to 9F, are obtained.

The gain control value decision circuit 111 applies the spectral components from the transform circuit for the acoustic model 109 and the masking curve from the acoustic model application circuit 110 to each of gain control values of plural patterns as variables, using the gain control position information from the gain control position decision circuit 102, and calculates the total number of bits required for encoding, for selecting the gain control value which gives the smallest total number of bits, for thereby determining an optimum gain control value from the gain control values of plural patterns.

Figure 9:
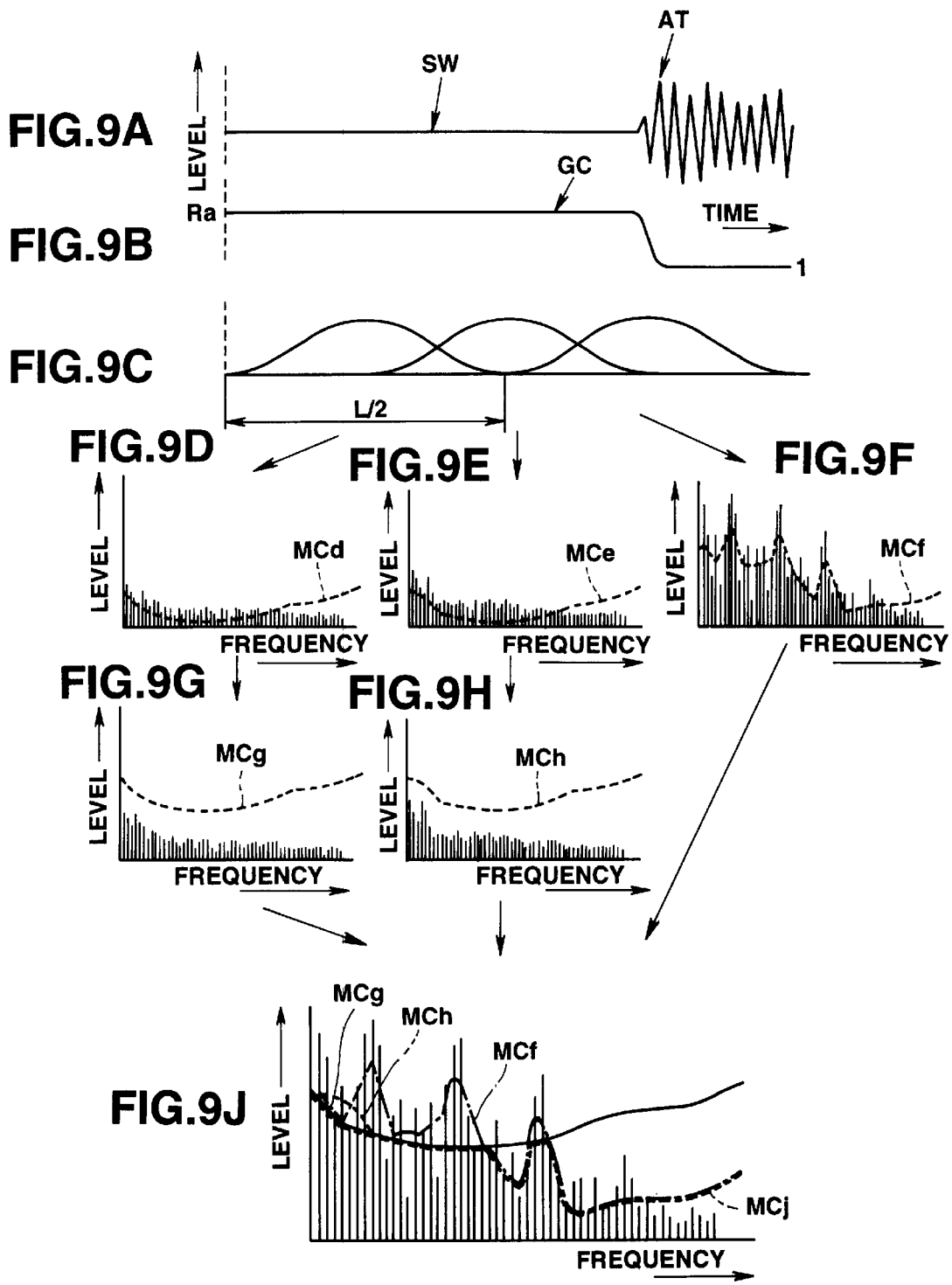
FIGS. 9A to 9J illustrate a processing technique of a the processing technique of a circuit for application of a psychoacoustic model of FIG. 1.

It is assumed that the input signal SW shown in FIG. 9A is used, and gain control with the gain control value Ra, such as the gain control function GC shown in FIG. 9B, is applied to the signal components directly previous to the attack portion AT. The gain control value Ra is a variable. At this time, the transform circuit for the acoustic model 109 outputs three spectral distributions each made up of m spectral components, as shown for example in FIGS. 9D to 9F, while the acoustic model application circuit 110 outputs the masking curves MCd, MCe and MCf as shown by broken lines in FIGS. 9D to 9F.

If the absolute values of the levels of the kAEth one of m spectral components of FIGS. 9D to 9F are Sd(k), Se(k), Sf(k) and the masking levels of the kAEth spectral components of FIGS. 9D to 9F are MCd(k), MCe(k) and MCf(k), respectively, the number of bits necessary for encoding the kAEth spectral component of FIG. 9D is log2(Sd(k)/MCd(k)) bits and 0 bit, for Sd(k)>MCd(k) and for Sd(k)≦MCd(k), respectively, where log2 is the logarithm having 2 as base. If, for simplicity, a function baf(a, b) is defined so that baf(a, b)=0 for a≦b and baf(a, b)=log2(a/b) for a>b, the number of bits required for encoding the kAEth spectral component in FIG. 9D is baf(Sd(k), MCd(k)).

Since the masking level for the block for the acoustic model is not gain-controlled as yet, the masking level for the block for the acoustic model is small in FIGS. 9D and 9E, while the masking level for the block for the acoustic model is large in FIG. 9F. The masking level for the acoustic model is then amplified by the smallest values of the gain control function for the corresponding signal portions. For example, the masking level is multiplied by Ra in FIGS. 9D and 9E, while that in FIG. 9F is multiplied by 1. Since the level of the signal for encoding is amplified in an amount corresponding to this multiplication factor Ra or 1, the masking curve for the block for the acoustic model is amplified by a corresponding ratio.

In FIGS. 9G and 9H, masking curves MCg and MCh for the blocks for the acoustic models shown by broken lines, are obtained by raising the level of the masking curves MCd and MCe of the blocks for acoustic models of FIGS. 9D and 9E by values equal to the gain control values. Consequently, since the three masking curves MCf, MCg and MCh shown by broken lines in FIGS. 9F, 9G and 9H denote masking levels for respective blocks for acoustic models, it is appropriate to use the smallest values of the masking levels for the block for the acoustic models as the masking level for the respective blocks for acoustic models. This gives a masking curve MCj for the encoding block corresponding to the smallest values of the masking curves MCf, MCg and MCh shown in FIGS. 9F, 9G and 9H, respectively.

If the masking level for the encoding block for the kAEth spectral component is MCj(k) and the masking levels for the kAEth spectral components of the masking curves MCg and MCh are denoted as MCg(k) and MCh(k), respectively, the masking level MCj(k) may be represented by:

$$MCj(k) = \min(MCg(k), MCh(k), MCf(k))$$
$$= \min(Ra \cdot MCd(k), Ra \cdot MCe(k), MCfk))$$

where min(a, b, c) is a function which returns the smallest value of a, b and c.

The spectral components of the encoding block in its entirety are the spectral components obtained from the transform circuit 104 of FIG. 6. These spectral components are obtained by gain-control processing the signal sliced into encoding blocks by the windowing circuit 101 of FIG. 6 by the gain control circuit 103 of FIG. 6 and transforming the resulting signal by the transform circuit 104. It is necessary to repeat similar processing each time the gain control value is changed in determining the gain control value. Although it is possible to calculate the total number of required bits by using spectral components obtained by this repetitive processing, the processing by the transform circuit is time-consuming so that the load of repeatedly performing the processing of the modulation circuit is considerable. In a preferred embodiment of the present invention, acoustic model block based spectral components are used in place of the spectral components obtained by the transform circuit 104 in determining the level of the spectral components by the gain control value decision circuit 111 for relieving this load. The absolute value of the level of the kAEth spectral component is found by the following relation:

Ra·Sd(k)+Ra·Se(k)+Sf(k)

Therefore, if the total number of the gain control values is N, and the iAEth gain control value is R(i), the total number of bits required for encoding all of the spectral components in an encoding block for the gain control value Ra=R(i) is S(k, i)=R(i)·Sd(k)+R(i)·Se(k)+Sf(k)

MCj(k, i)=min (R(i)·MCd(k), R(i)·MCe(k), MCfk))

The optimum gain control value can be determined by repeating the above calculations until i becomes from 1 to N, and by finding R(i) which will give the smallest value of the total number of bits NB(i).

In the above-described embodiment of finding the gain control value, it is assumed that there exist an attack portion and a signal portion with extremely small signal amplitudes upstream of the attack portion in the same encoding block. If there exist a release portion in the same encoding block in addition to the attack portion and the signal portion with extremely small signal amplitudes, it suffices to perform separate calculations by the above-described method. That is, the release portion is assumed to be not gain controlled and the attack portion inclusive of the release portion is deemed to be an attack portion. The above-described method is applied to the attack and release portions and an optimum gain control value for the signal components of the release portion is found. This enables respective optimum gain control values to be found of the signal portion with extremely small amplitudes upstream of the attack portion and the release portion.

The optimum gain control value, thus found, is converted into the gain control function, based on the gain control position information, and sent to the gain control circuit 103. The masking curve for the encoding block for the optimum gain control value is sent to the quantization precision decision circuit 112 where the quantization precision is calculated using the spectral components supplied from the transform circuit 104 and the masking level for the encoding block. The quantization circuit 106 quantizes the signal from the normalization circuit 105 using the quantization precision information.

The finer the degree of division of an encoding block into acoustic model blocks, the smaller becomes the effect of gain control on the psychoacoustic model. Therefore, the length of divisions of masking analysis is preferably short up to the length of analysis of gain control. However, if the length for analysis becomes short as a result of division, the frequency resolution for masking analysis is correspondingly lowered. Therefore, the degree of division is preferably set so as not to produce any adverse effects on the masking analysis.

Meanwhile, in the above-described embodiment of the signal encoding device of FIG. 6, the frequency spectrum is divided into plural overlapped blocks for acoustic model and the masking level is calculated from block to block prior to encoding. In finding the masking level for each divided acoustic model block, the gain control value in each acoustic model block is used. However, the position of gain control level switching in general is not necessarily coincident with the position of division into the blocks for acoustic model blocks. Thus, if the two are not coincident with each other, the smallest gain control value of the acoustic model block is used. Consequently, complex processing needs to be carried out if optimum masking level conversion is performed depending on the gain control level switching positions.

Although the probability of the gain control level switching position being different from the acoustic model block division position may be lowered by increasing the number of division of the encoding block for reducing the acoustic model block length, limitations are imposed on the number of division since the increased number of division lowers the frequency resolution of the masking analysis. Therefore, with the above-described first technique, complex processing is required for realizing coincidence of the two positions.

With the second embodiment of the signal encoding method according to the present invention, a signal for acoustic model analysis matched to the gain control position is produced from the input signal, the masking level is calculated from the signal for analysis and the gain control value is found from the masking level for allowing to find the gain control value matched to the gain control position.

Figure 1B:
Figure 1C:
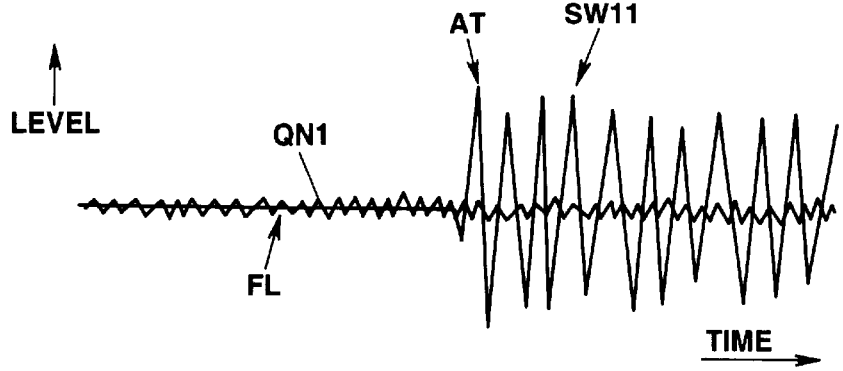
Figure 5A:
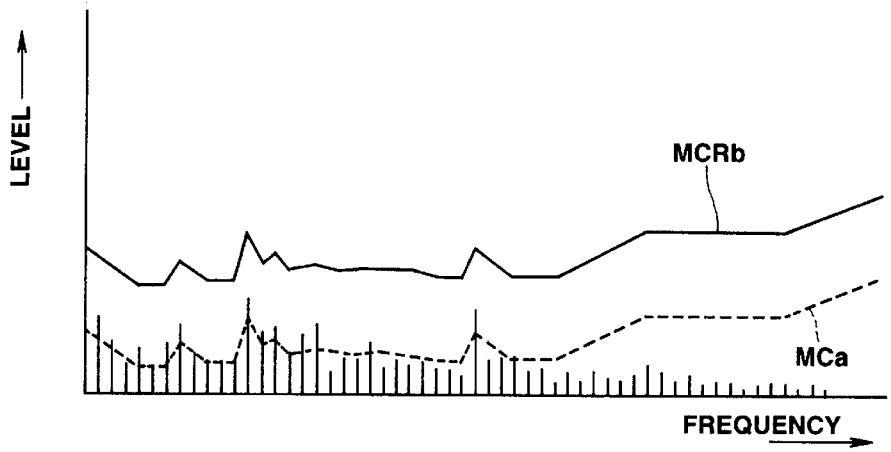
FIGS. 5A to 5C are graphs similar to FIGS. 4A to 4C for illustrating the status of a psychoacoustic model in the conventional processing technique for preventing occurrence of pre-echo.
Figure 5B:
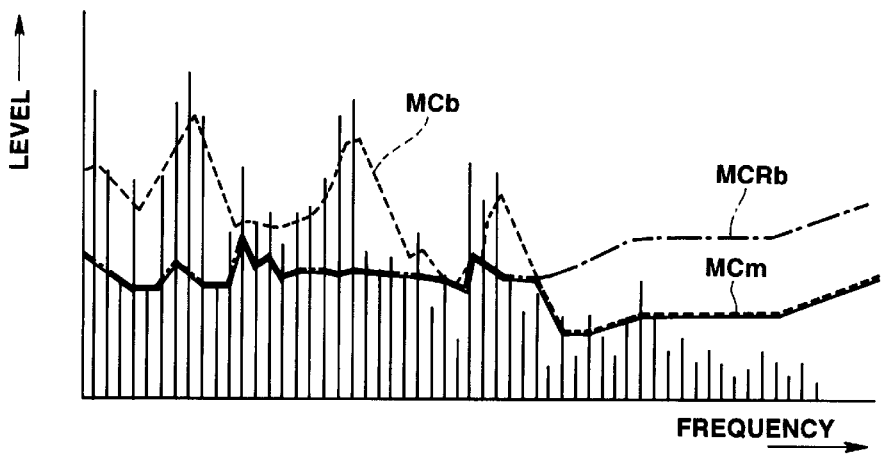
Figure 5C:
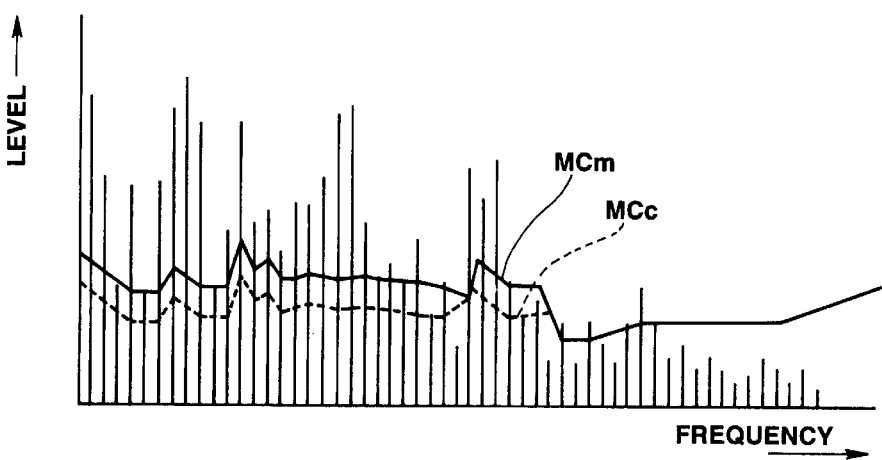
Figure 10:
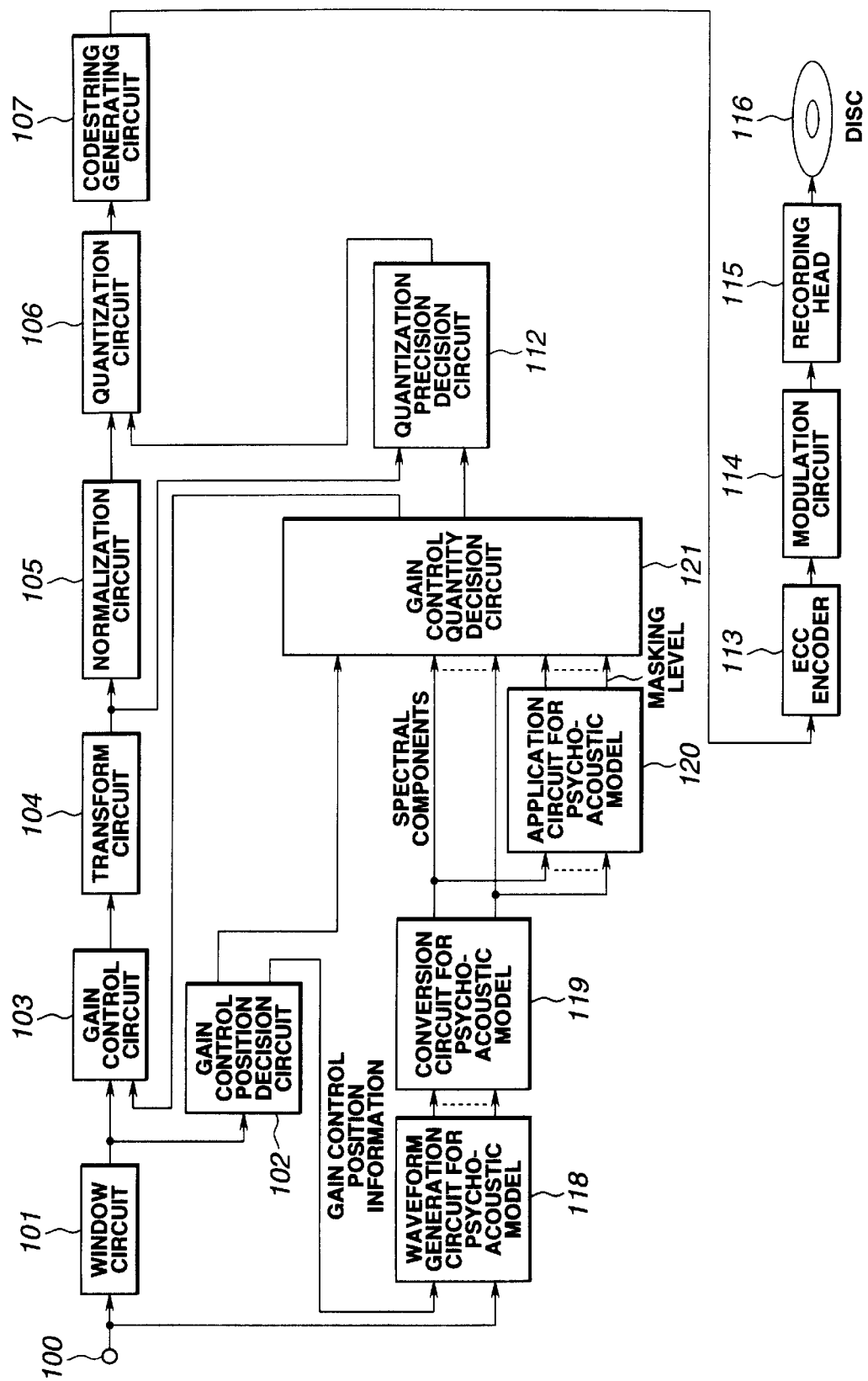
FIG. 10 is a schematic block diagram showing a second embodiment of a signal encoding device according to the present invention.

FIG. 10 shows the schematic structure of a signal encoding device for carrying out the second signal encoding method of the present invention. In FIG. 5, the elements corresponding to those of FIG. 1 are denoted by the same numerals and the corresponding description is not made except the portions necessary for description of the present second encoding method.

The second signal encoding device of the present invention has a waveform generating circuit 118 for an acoustic model, for generating a signal for acoustic model analysis from the input signal, a transform circuit 119 for transforming the signal for acoustic model analysis into frequency components for acoustic model analysis, an acoustic model application circuit 120 for applying a psychoacoustic model to the frequency components for acoustic model analysis for outputting the masking level as the results of analysis, and a gain control value decision circuit 121 for determining the optimum gain control value from the gain control position information from the gain control position decision circuit 102, frequency components for analysis of the psychoacoustic model, and the masking level, in place of the components from the windowing circuit for acoustic model 108 to the gain control value decision circuit 111.

The operation of the portions of the signal encoding device of FIG. 10 different from those of FIG. 6 is hereinafter explained.

The acoustic signal sent to the terminal 100 is sent to a circuitry downstream of the windowing circuit 101 and to the waveform generating circuit 118 for acoustic model. To the waveform generating circuit 118 for acoustic model is also supplied the gain control position information as found by the gain control position decision circuit 102.

The acoustic model waveform generating circuit 118 first slices the acoustic signal supplied to terminal 100 into blocks each of a fixed length and overlaps neighboring blocks while multiplying each block with a transform windowing function for transform. The acoustic model waveform generating circuit 118 then generates plural waveform signals for acoustic model analysis, based on the gain control position information sent from the gain control position decision circuit 102, and sends the generated waveform signals separately to the acoustic model transform circuit 119. If the gain control position information sent from the gain control circuit 102 has not been amplified, the acoustic model waveform generating circuit 118 multiplies the information with a windowing function for transform after block-based slicing and sends the resulting signal directly to the acoustic model transform circuit 119. The detailed processing by the acoustic model waveform generating circuit 118 will be explained subsequently.

The acoustic model transform circuit 119 processes one or more signal waveforms for acoustic model analysis sent from the acoustic model waveform generating circuit 118 with orthogonal transform by a technique which is the same or different to the that by transform circuit 104. The spectral components obtained from this orthogonal transform are sent to the acoustic model application circuit 120 and to the gain control value decision circuit 121.

The acoustic model application circuit 120 applies a psychoacoustic model to one or more spectral components sent from the acoustic model transform circuit 119 for calculating an appropriate masking level for each of the spectral components. That is, the acoustic model application circuit 120 calculates, for each frequency corresponding to each spectral component obtained by the acoustic model transform circuit 119, the minimum audibility level or the masking level as found from the supplied spectra components using the masking characteristics or loudness characteristics. The information on the masking level is sent to the gain control value decision circuit 121.

If there are plural sorts of the masking level information sent from the acoustic model application circuit 120, the gain control value decision circuit 121 calculates the total number of bits required for encoding the spectral components for each of plural gain control values, using the information on the plural masking levels, plural spectral components sent from the acoustic model transform circuit 119 and the gain control position information sent from the gain control position information decision circuit 102, and finds the gain control value which minimizes the total number of bits, in order to calculate the optimum gain control value and optimum gain control function. The results are sent to the gain control circuit 103.

The gain control value decision circuit 121 transforms the masking, using the gain control function, for calculating the appropriate masking level for the encoding block for gain-controlled spectral components, and sends the results to the quantization precision detection circuit 112. If only one sort of the masking level information is sent from the acoustic model application circuit 120, the received masking level information is directly sent as the masking level for the encoding block to the quantization precision detection circuit 112. The detailed processing by the gain control value decision circuit 121 will be explained subsequently.

The quantization precision detection circuit 112 determines the quantization precision using the spectral components of respective bands sent from the transform circuit 104 and the masking level information for the encoding block sent from the gain control value decision circuit 121 and sends the resulting quantization precision information to the quantization circuit 106.

The basic structure of decoding device for decoding the codestring signal generated by the encoding device shown in FIG. 10 and recorded on an information recording medium or transmitted on a transmission medium for restoration of the digital audio signal is similar to that of FIG. 2 and hence is not explained for simplicity.

The processing by the acoustic model waveform generating circuit 118 is now explained.

First, the gain control position decision circuit 102 determines the gain controlling position, before and after the attack portion, of the waveform signal subjected to pre-echo and post-echo, as in the case of FIG. 6.

Further, in the arrangement of the present invention, the acoustic model waveform generating circuit 118 refers to the gain control position and divides the waveform signal by applying a window so that a waveform signal will be produced for each gain control level for acoustic model analysis for calculating the masking level for each waveform signal.

It is assumed that the waveform signal SW as shown in FIG. 11A have been entered at the input terminal 100 and the gain control position decision circuit 102 has set the gain control positions such that the waveform signal SW is divided into a quasi-stationary signal FL, an attack portion AT and a release portion RE, for each of which the gain control is performed, as shown in FIG. 11B. The acoustic model waveform generating circuit 118 then slices the input signal into blocks and has neighboring blocks overlapped with each other. The acoustic model waveform generating circuit 118 then multiplies the block with a windowing function for transform for slicing the signal component of the waveform signal SW of FIG. 11A. That is, the acoustic model waveform generating circuit 118 multiplies the signal with separating windowing functions shown in FIGS. 11C to 11E. That is, the acoustic model waveform generating circuit 118 multiplies the signal with separating windows the level transition portions of which are coincident with the transition portions of the gain control function, thereby dividing the waveform signal into waveform components of the FL, AT and RE portions.

Of the separating windowing functions, the window C1 for separating the FL portion suppresses the level of the signal portions other than the FL portion, that is portions AT and RE, while leaving the FL portion intact. The window C2 for separating the AT portion and the window C3 for separating the RE portion similarly suppress the levels of the signal portions other than the target portions to zero. The transition points of the levels of the windows are set so as to coincide with the level transition points of the gain control function. The result is that the waveform signal of FIG. 11A is separated into three waveform signals SWd, Swe and SWf, as shown in FIGS. 11E to 11H, respectively. The plural waveform components, thus found, are sent to the acoustic level transform circuit 119.

By multiplying the signal for analysis for acoustic model with separating windows for separating the analysis signal for acoustic model from one gain control level to another for correcting the level, it becomes possible to calculate the masking levels at the gain control positions of the signal irrespective of the switching positions of the gain control level of the input signal.

The processing by the gain control value decision circuit 121 is now explained by referring to FIGS. 12A to 12G.

Figure 12A:
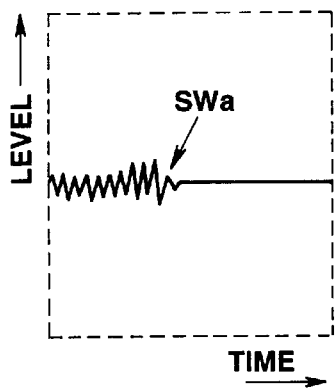
FIGS. 12A to 12G illustrate the processing technique of the circuit for generating a waveform for the psychoacoustic model of FIG. 5.
Figure 12B:
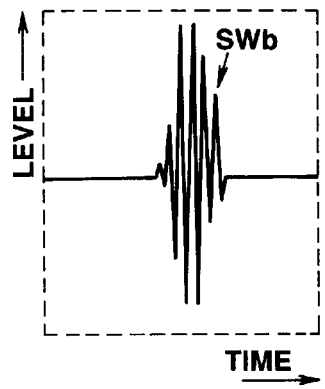
Figure 12C:
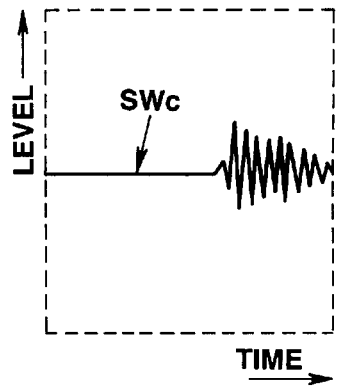
Figure 12D:
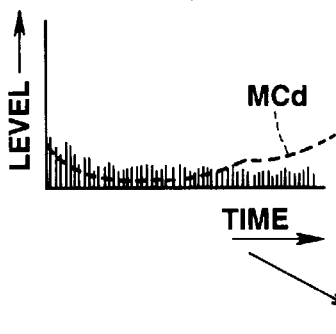
Figure 12E:
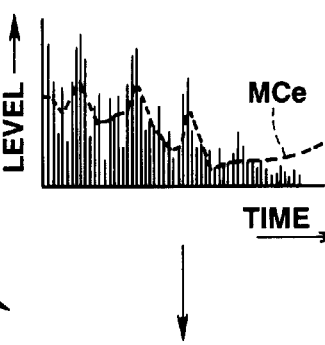
Figure 12F:
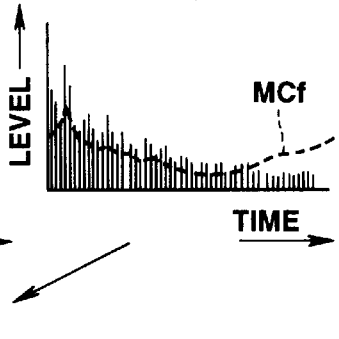

The acoustic model transform circuit 119 performs orthogonal transform on one or more waveform signals obtained by the acoustic model waveform generating circuit 118 and sends the resulting signal to the acoustic model application circuit 120 and to the gain control value decision circuit 121. If the waveform signals SWa, SWb and SWc, separated depending on the gain control levels, are inputted to the acoustic model transform circuit 119, as shown in FIGS. 12A to 12C, three spectral distributions, each made up of m spectral components, are outputted, as shown in FIGS. 12D to 12F. It is noted that the waveform signals SWa, SWb and SWc correspond to the waveform signals SWd, SWe and SWf shown in FIGS. 11F to 11H, respectively.

The acoustic model application circuit 120 applies the psychoacoustic model to one or more spectral components sent from the acoustic model transform circuit 119. For example, if the spectral distribution as shown in FIGS. 12D to 12F are obtained, a psychoacoustic model is applied thereto for finding the masking level. From the masking level, thus found, three masking curves MCd, MCe and MCf, as shown by broken lines in FIGS. 12D to 12F, are obtained.

The gain control value decision circuit 121 determines an optimum gain control value and an optimum gain control function, using one or more spectral distributions obtained by the acoustic model transform circuit 119 and one or more masking levels obtained by the acoustic model application circuit 120 and sends the optimum gain control value and the optimum gain control function thus obtained to the gain control circuit 103. The gain control value decision circuit 121 also determines the optimum masking level for the encoding block to be applied to the encoding block and sends the optimum masking level thus determined to the quantization precision decision circuit 112.

That is, if the absolute values of the levels of the kAEth spectral components of the three spectral distributions, each made up of m spectral components, shown in FIGS. 12D to 12F, are Sd(k), Se(k) and Sf(k), respectively, and the masking levels for the kAEth spectral component of the three masking curves shown by broken lines in FIGS. 12D to 12F, are MCd(k), MCe(k) and MCf(k), respectively, the gain control value decision circuit 121 first determines, from plural gain control values, an optimum gain control value Ra to be applied to the signal portion with extremely small amplitudes previous to the attack portion of the signal SWa shown in FIG. 12A. If, among N gain control values, the iAEth gain control value is R(i), the total number of bits NA(i) required for encoding the spectral components in the encoding block is given by:

$$S(k,i) = R(i) \cdot Sd(k) + Se(k) + Sf(k)MC(k,i)$$
$$= \min(R(i) \cdot MCd(k), MCe(k), MCf(k))$$

By repeating the above calculations from i=1 to i=N, for finding R(i) which will give the smallest value of the total number of bits NA(i), it becomes possible to determine the optimum gain control value Ra to be applied to the signal SWa shown in FIG. 12A.

For determining the optimum gain control value Rr to be applied to the release portion, that is the signal SWc shown in FIG. 7C, the total number of bits NC(i), required for encoding the spectral components in an encoding block for the gain control value R(i), is given by:

$$S(k,i) = Sd(k) + Se(k) + R(i) \cdot Sf(k)MC(k,i)$$
$$= \min MCd(k), MCe(k), R(i) \cdot MCf(k))$$

By repeating the above calculations from i=1 to i=N, for finding R(i) which will give the smallest value of the total number of bits NC(i), it becomes possible to determine the optimum gain control value Rr to be applied to the signal SWc shown in FIG. 12C.

The gain control function is calculated, using the gain control values, thus determined, and the gain control position information obtained by the gain control position decision circuit 102, and sent to the gain control circuit 103.

Figure 12G:
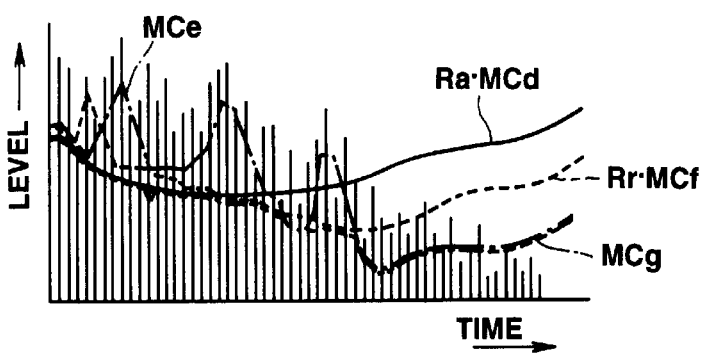

For calculating the masking curve for the encoding block applied to the encoding block, the gain control value decision circuit 121 amplifies the masking levels obtained from the acoustic model application circuit 120 in meeting with the respective gain control levels by a value corresponding to the gain control level. That is, gain control value decision circuit 121 amplifies the masking levels of the masking curves MCd, MCe and MCf of FIGS. 12D, 12E and 12F with factors of R, 1 and Rr, respectively, as shown in FIG. 11B. As for the masking level for an encoding block, the minimum values of the masking level divided and amplified by a value corresponding to the gain control value are suitably employed, so that, as for the spectrum amplified under gain control, as shown in FIG. 12G, a masking curve obtained by interconnecting minimum values of the masking curves Ra·MCd, MCe and Rr·MCf, as indicated by a thick broken line in FIG. 12G, is preferably employed.

The masking level for an encoding block, thus found, is sent to the quantization precision decision circuit 112 where quantization precision the of the encoding block is calculated and quantized in the quantization circuit 106. That is, encoding can be done in the quantization circuit 106 under application of the psychoacoustic model.

In the above-described embodiment, shown in FIG. 10, in which the masking levels are calculated with the spectral components for each gain control position, and the gain control value which will give the smallest value of the total number of bits required for encoding the spectral components in the encoding block, is determined using the spectral components and the masking level, it becomes possible to determine a suitable gain control value despite switching positions of the gain control level of the input signal.

Meanwhile, in the embodiment shown in FIGS. 6 and 10, the signal supplied to the terminal is a full frequency range signal. However, in acoustic signals as encountered with orchestra performance, there are occasions wherein time changes of an envelope are varied from one frequency band to another, as when the performance of a second musical instrument is started as the sound of a first musical instrument is diminished and in continuation to the performance of the first musical instrument occupying a frequency range different from the frequency range occupied by the second instrument. In such case, it is desirable to perform gain control of different positions and different values from one frequency range to another. However, in the above-described arrangements, shown n FIGS. 6 and 10, it is not possible to perform gain control different from one frequency range to another.

With this in view, in a third signal encoding method of the present invention, the waveform signal is divided using a band-splitting filter for performing gain control desirable from one split band to another and for determining an optimum gain control value from one split band to another.

Figure 13:
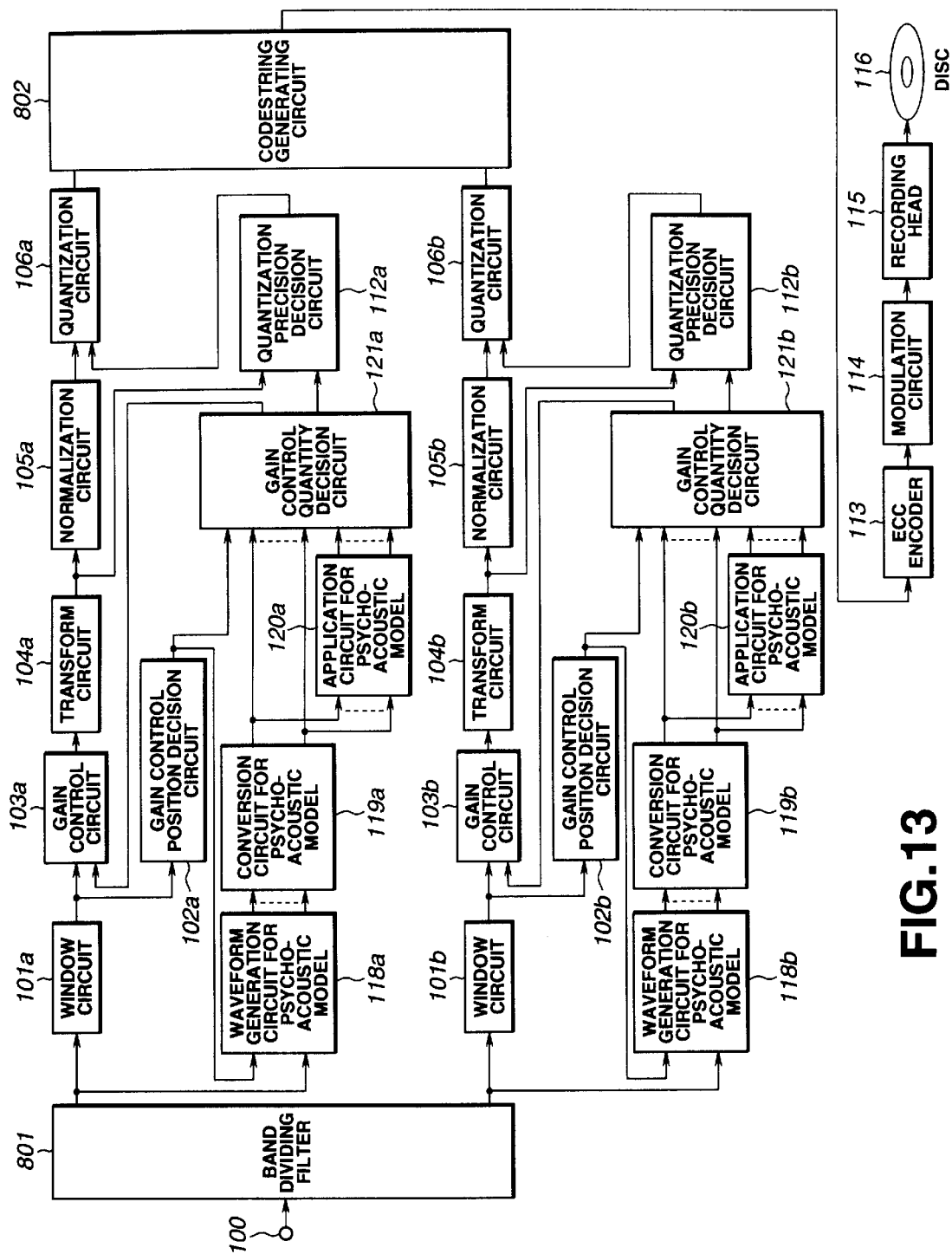
FIG. 13 is a schematic block diagram for illustrating a third embodiment of a signal encoding device according to the present invention.

FIG. 13 shows a schematic structure of a signal encoding device to which is applied the third signal encoding method according to the present invention. In this figure, the component parts corresponding to those of FIGS. 6 and 10 are denoted by the same numerals and the description therefor is omitted except those necessary for the present embodiment. The component parts used in common with those of the previous embodiments are indicated by the corresponding numerals added to with suffices a and b for facility in discrimination.

In the third signal encoding device of the present invention, shown in FIG. 13, the component parts except the codestring generating circuit 107 in the arrangement of FIG. 10 are arranged in two channels. The corresponding component parts of the two channels are denoted by the same numerals as those used in FIG. 10 added to with suffices a and b for distinction between the two channels. In addition, a band-splitting filter 801 is arranged upstream of the windowing circuit 101 in FIG. 10, and a codestring generating circuit 802 is arranged downstream of the quantization circuit 106 of FIG. 10.

As for the signal encoding device, shown in FIG. 13, mainly the different portions are explained.

In FIG. 13, acoustic signals (waveform signals), such as digital audio signals, are supplied to the terminal 100. The signals are split into two bands by the band-splitting filter 801 such as a polyphase quadrature filter. The waveform signals of the respective bands from the band-splitting filter 801 are sent to windowing circuits 101a, 101b and waveform generating circuits 118a, 118b for acoustic model. In the embodiment of FIG. 13, the input signal is outputted in two bands as from the band-splitting filter 801 so that optimum gain control can be performed for each of the two bands. Of course, desirable gain control can be performed for each of a larger number of bands by increasing the number times of band splitting by the band-splitting filter.

The processing by components from the windowing circuits 101a, 101b up to the quantization circuits 106a, 106b, the processing by components from the acoustic model waveform signal generating circuits 118a, 118b up to the gain control value decision circuits 112a, 112b and the processing by components up to the quantization precision decision circuits 112a, 112b are the same as those in the embodiment of FIG. 5 and hence the description is not made for simplicity.

The codestring generating circuit 802 converts the band-based quantized signal supplied from the quantization circuits 106a, 106b into a codestring based on the simultaneously supplied quantization information. In the output signal of the codestring generating circuit 802, there are contained, in addition to the signals quantized by the quantization circuits 106a, 106b, the normalization coefficient information from the normalization circuits 105a, 105b, the quantization precision information from the quantization precision decision circuits 112a, 112b, attack/release portion detection flag, the corresponding position information, gain control information and the gain control function.

The processing by components from the ECC encoder 113 up to the disc 116 is the same as that shown in FIGS. 11A to 11H and hence the corresponding description is omitted for simplicity.

Figure 14:
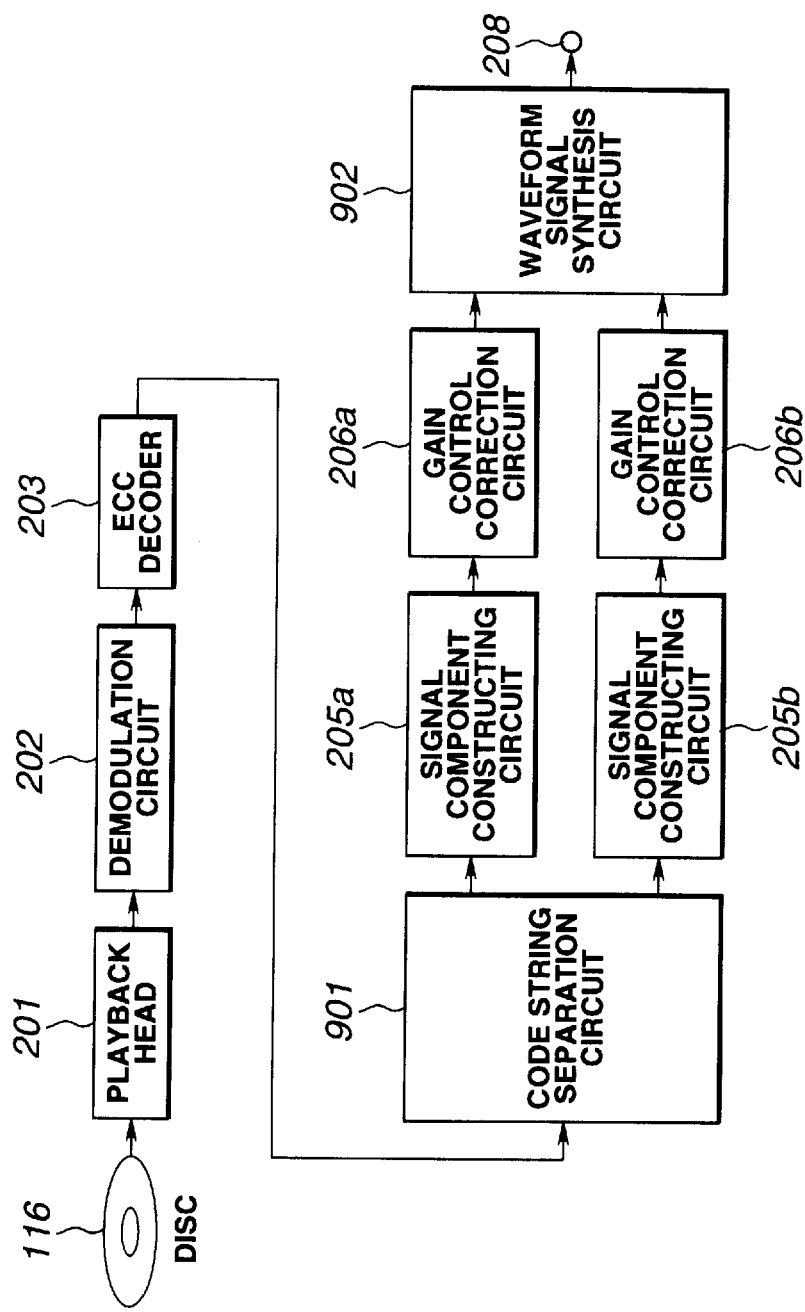
FIG. 14 is a schematic block diagram showing a third embodiment of a signal decoder according to the present invention.

FIG. 14 shows a basic structure of a decoding device for decoding the codestring signal generated by the third codestring generator shown in FIG. 13 and recorded on the disc 116 or transmitted over a transmission medium for restoration to a digital audio signal. In FIG. 14, the component parts corresponding to those shown in FIG. 2 are denoted by the same reference numerals add to with suffices a and b for the component parts used in duplicates. The corresponding description is not made except a different structure.

In FIG. 14, a codestring separating circuit 901 separates the band-based quantized signals, normalization coefficient information and the quantization precision information for the two bands explained in connection with FIG. 13, from the codestring signal supplied from the ECC decoder 203, and sends the information or signal to waveform signal re-constructing circuits 205a, 205b.

A waveform signal synthesis circuit 902 synthesizes the band-based signals sent from the gain control correction circuits 206a, 206b. This causes synthesized digital audio signals to be outputted from the waveform signal synthesis circuit 902.

As described above, the input waveform signal is divided by a frequency spectrum splitting filter into plural frequency bands, the gain control position is determined from one frequency band to another by the band-based gain control position decision circuit and the optimum gain control value is determined on the band basis by the band-based gain control value decision circuit, so that gain control of an optimum value may be performed at optimum positions from one frequency band to another even for a signal the time changes of the envelope of which are changed from one frequency band to another.

The foregoing description has been made in connection with a method for determining the gain control value in gain control which renders the quantization noise less obtrusive in case of quantization of the audio signals as waveform signals. However, the present invention is effective in rendering the generation of the quantization noise of other sorts of the signals less obtrusive and hence may be applied to, for example, picture signals. However, since the pre-echo or post-echo in the attack portion in audio signals is obstructive to the hearing sense, the present invention may be effectively applied to the audio signals. In addition, the present invention may also be applied to the multi-channel audio signals.

According to the present invention, the attack portion and the release portion are detected, and at least the waveform elements previous to the attack portion and the waveform elements of the release portion are gain-controlled using the gain control value adaptively selected from plural gain control values in accordance with the masking level as found based on the psychoacoustic model of the waveform signals, so that it becomes possible to prevent the pre-echo and the post-echo from being produced. In addition, the number of bits required for encoding is minimized at the time of selection of the gain control value, thus enabling efficient encoding.

What is claimed is:

1. A gain controlling method used in an encoding device for audio signals, comprising the steps of:
   detecting an attack portion in which the signal level of waveform elements of the waveform signals rises sharply;
   detecting a release portion in which the signal level of the waveform signals decays sharply;
   finding a masking level based on a psychoacoustic model using the waveform signals and the detection position information of the attack portion and the release portion;
   adaptively selecting a gain control value from plural gain control values using the above masking level;
   gain-controlling at least the waveform elements previous to the attack portion and the waveform elements of the release portion, using the selected gain control value;
   transforming the gain-controlled waveform signals into plural frequency components; and
   encoding the control information for gain control and said plural frequency components.

2. The gain control method as claimed in claim 1 wherein said masking level is found from frequency components obtained on orthogonal transform of said waveform signals.

3. The gain control method as claimed in claim 1 wherein said step of finding the masking level splits the waveform signals into plural overlapped areas for analysis and finds said masking level from said plural areas for analysis.

4. The gain control method as claimed in claim 1 wherein said step of finding the masking level splits the waveform signals into plural waveform signals in each detected gain control position and finds the masking level from said plural split waveform signals.

5. The gain control method as claimed in claim 1 wherein said step of selecting the gain control value calculates the number of bits required for encoding for at least a portion of plural gain control values; and selecting a gain control value which minimizes the required number of bits.

6. The gain control method as claimed in claim 5 wherein, for calculating, the number of bits, frequency components obtained on gain-controlling the waveform signals and orthogonally transforming the gain-controlled waveform signals are used.

7. The gain control method as claimed in claim 5 wherein, for calculating the number of bits, frequency components obtained on slitting the waveform signals into overlapped plural separate areas for analysis and orthogonally transforming the plural waveform signals obtained from said areas for analysis.

8. The gain control method as claimed in claim 5 wherein, for calculating the number of bits, frequency components obtained on splitting the waveform signals for each detected gain control position into plural waveform signals and orthogonally transforming the plural split waveform signals are used.

9. A gain controlling apparatus used in an encoding device for audio signals, comprising:
   means for detecting an attack portion in which the signal level of waveform elements of the waveform signals rises sharply;
   means for detecting a release portion in which the signal level of the waveform signals decays sharply;
   means for finding a masking level based on a psychoacoustic model using the waveform signals and the detection position information of the attack portion and the release portion;
   means for adaptively selecting a gain control value from plural gain control values using at least said masking level;
   means for gain-controlling at least the waveform elements previous to the attack portion and the waveform elements of the release portion, using the selected gain control value;
   means for transforming the gain-controlled waveform signals into plural frequency components; and
   means for encoding the control information for gain control and said plural frequency components.

10. The gain control apparatus as claimed in claim 9 wherein said means for calculating the masking level finds the masking level from frequency components obtained on orthogonal transform of said waveform signals.

11. The gain control apparatus as claimed in claim 9 wherein said means for finding the masking level splits the waveform signals into plural overlapped areas for analysis and finds said masking level from said plural split areas for analysis.

12. The gain control apparatus as claimed in claim 9 wherein said means for finding the masking level splits the waveform signals into plural waveform signals for each detected gain control position and finds the masking level from said plural split waveform signals.

13. The gain control apparatus as claimed in claim 9 wherein said means for selecting the gain control value calculates the number of bits required for encoding for at least a portion of plural gain control values; and selecting a gain control value which minimizes the required number of bits.

14. The gain control apparatus as claimed in claim 13 wherein, for calculating the number of bits, frequency components obtained on gain-controlling the waveform signals and orthogonally transforming the gain-controlled waveform signals are used.

15. The gain control method as claimed in claim 13 wherein, for calculating the number of bits, frequency components obtained on slitting the waveform signals into overlapped plural separate areas for analysis and orthogonally transforming the gain-controlled waveform signals obtained from said areas for analysis are used.

16. The gain control method as claimed in claim 13 wherein, for calculating the number of bits, frequency components obtained on splitting the waveform signals for each detected gain control position into plural waveform signals and orthogonally transforming the plural split waveform signals are used.

* * * * *